United States Patent
Kurobe et al.

(10) Patent No.: US 7,609,681 B2
(45) Date of Patent: Oct. 27, 2009

(54) COMMUNICATION APPARATUS AND COEXISTENCE METHOD FOR ENABLING COEXISTENCE OF COMMUNICATION SYSTEMS

(75) Inventors: Akio Kurobe, Osaka (JP); Go Kuroda, Osaka (JP); Koji Ikeda, Fukuoka (JP); Hisao Koga, Fukuoka (JP); Yuji Igata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 11/542,153

(22) Filed: Oct. 4, 2006

(65) Prior Publication Data

US 2007/0097960 A1    May 3, 2007

(30) Foreign Application Priority Data

Oct. 5, 2005   (JP)   ............................ 2005-292914
Nov. 2, 2005   (JP)   ............................ 2005-319357

(51) Int. Cl.
*H04L 12/66*   (2006.01)

(52) U.S. Cl. ........................ 370/347; 323/319; 327/79

(58) Field of Classification Search .................. 455/507
See application file for complete search history.

(56) References Cited

U.S. PATENT DOCUMENTS 6,697,633 B1 *   2/2004   Dogan et al. .................. 455/509

2004/0070912 A1   4/2004   Kopp
2005/0032534 A1 *   2/2005   Yoshizawa et al. .......... 455/507

FOREIGN PATENT DOCUMENTS

| JP | 59-40728 | 3/1984 |
|---|---|---|
| JP | 6-216895 | 8/1994 |
| JP | 2002-368831 | 12/2002 |
| JP | 2003-244037 | 8/2003 |
| JP | 2005-73240 | 3/2005 |
| WO | 03/069796 | 8/2003 |

OTHER PUBLICATIONS

Yu-Ju Lin et al., "A Comparative Performance Study of Wireless and Power Line Networks", IEEE Communication Magazine, Apr. 2003, pp. 54-63.
Supplementary European Search Report issued Mar. 30, 2009 in corresponding EP Application No. 06811046.

* cited by examiner

*Primary Examiner*—Vincent P Harper
*Assistant Examiner*—Natasha Cosme
(74) *Attorney, Agent, or Firm*—Wenderoth, Lind & Ponack, L.L.P.

(57) ABSTRACT

In-home communication systems 110 and 130 and an access communication system 120 that are capable of co-existing. The communication systems 110 and 130 and the access communication system 120 are able to co-exist by utilizing TDM that is in synchronization with a power cycle. Further, communication system that needs to secure AV-QoS assigns transmission timing to a slave station within itself by synchronizing a beacon cycle with a cycle of a power line.

6 Claims, 24 Drawing Sheets

F I G. 1 4
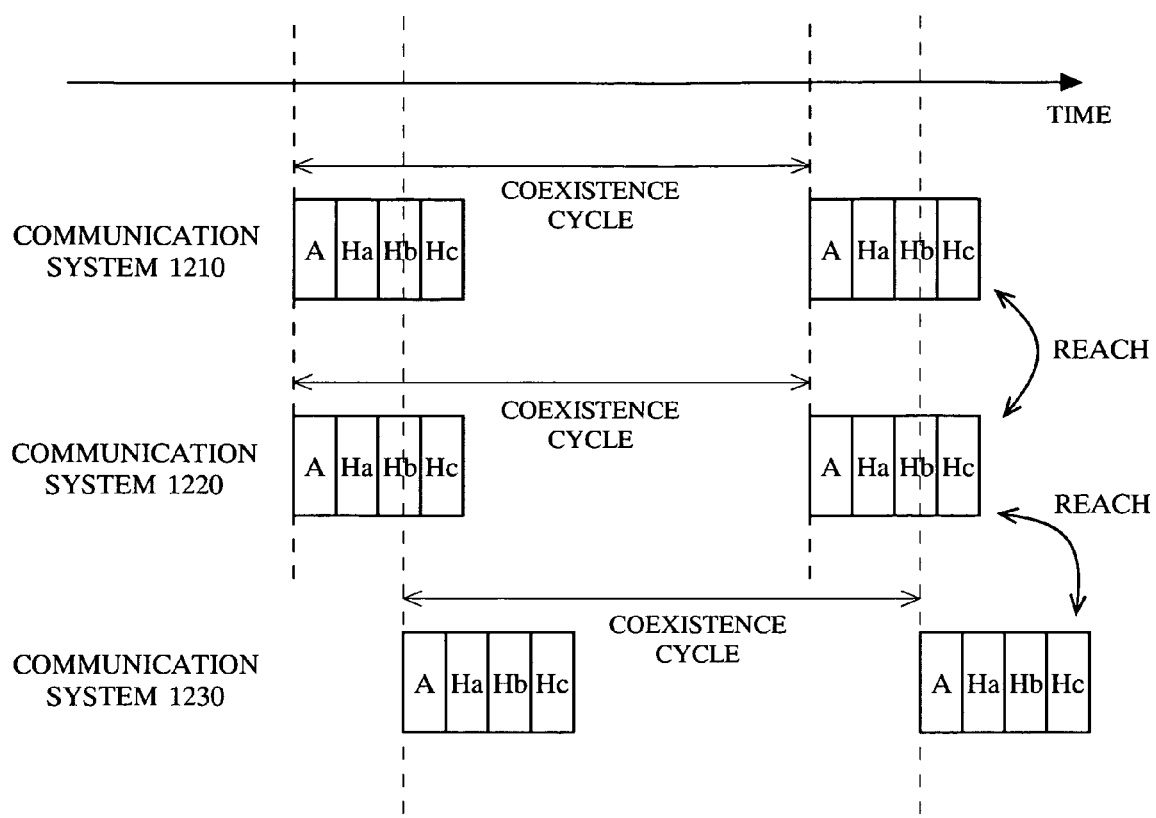

F I G. 2 0 PRIOR ART

F I G. 2 4    PRIOR ART
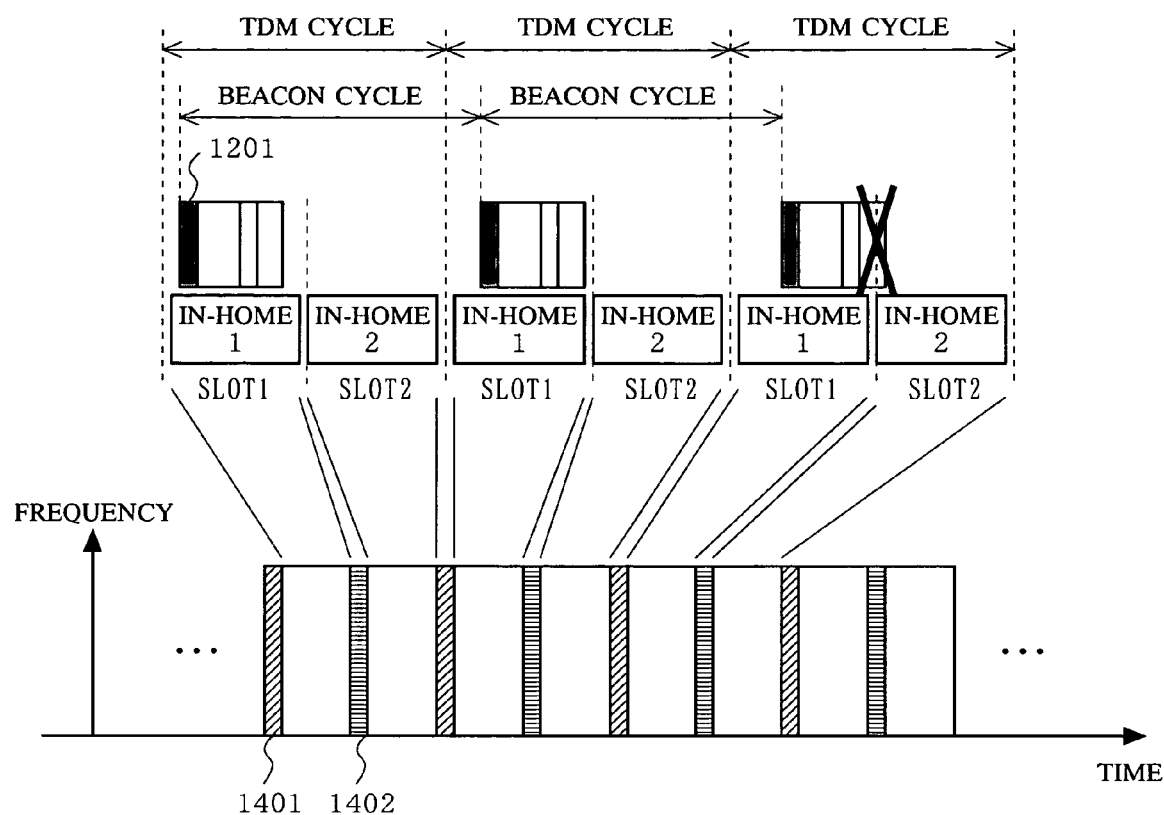

COMMUNICATION APPARATUS AND COEXISTENCE METHOD FOR ENABLING COEXISTENCE OF COMMUNICATION SYSTEMS

BACKGROUND OF THE INVENTION

1. Field of the Invention

The present invention relates to a communication apparatus and a coexistence method for enabling coexistence of communication systems. More particularly, the present invention relates to a technique of enabling coexistence of two communication systems which use the same communication medium and have different communication schemes (data communication is performed while maintaining AV-QoS (Audio Video-Quality of Services) required for video transmission and audio communication), a communication apparatus included in each of the communication systems, and a coexistence method which is executed by the communication apparatus.

2. Description of the Background Art

Power line communication technology is a communication means for connection of a Personal Computer (PC) in a home to a network apparatus, such as a broadband router or the like, so as to access from the PC to the Internet. In the power line communication technology, since an existing power line is used as a communication medium, it is not necessary to perform a new wiring work, and high-speed communication can be achieved only by inserting a power supply plug into a power supply outlet available throughout a home. Therefore, research and development, and demonstration experiments of the power line communication technology have been vigorously conducted all over the world, and in Europe and the USA, a number of power line communication projects have already been commercialized.

An example of the power line communication is HomePlug Ver. 1.0 (see Yu-Ju Lin, "A Comparative Performance Study of Wireless and Power Line Networks", IEEE Communication Magazine, April, 2003, pp. 54-63), which is a specification created by the HomePlug Powerline Alliance (USA). The specification is intended to be used mainly in applications, such as the Internet, mailing, and file transfer which are performed by PCs. HomePlug employs a CSMA/CA technique for a medium access control of which power line communication modem accesses a power line, and provides best-effort communication which does not guarantee a band to be used.

FIG. 18 is a diagram illustrating a configuration of a general communication system when accessing the Internet. In FIG. 18, a PC 2501 is connected via an Ethernet 2511, a broadband router 2502, and an access line 2512 to the Internet 2522. As the access line 2512, ADSL, FTTH, or the like is generally used. Here, when a place where the access line 2512 is withdrawn into a home is different from a room where the PC 2501 is placed, the Ethernet 2511 needs to be extended. Therefore, a power line communication apparatus has been commercialized in the form of a conversion adaptor between power line communication and Ethernet.

FIG. 19 illustrates a configuration of a communication system employing a conversion adaptor. In FIG. 19, two power line communication-Ethernet conversion adaptors 2603 and 2604 are connected to power supply outlets in rooms where a PC 2601 and a broadband router 2602 are installed, respectively, and provide best-effort communication by using power line communication via an in-home power line 2614. Thus, by using power line communication, wiring work is not required, and high-speed communication can be achieved only by inserting a power supply plug into a power supply outlet available throughout a home.

In Europe (Spain, etc.), an access power line communication modem has been used which employs, as an access line to the Internet, a power line for supplying a power to a home. FIG. 20 is a diagram illustrating a situation where the access power line communication modem is used. An access power line communication modem master station 2703 provided at an outdoor transformer, is connected via an intermediate voltage power distribution line 2713 to a broadband line, and communicates with an access power line communication in-home modem 2702 via a low voltage power distribution line 2712, a distribution switchboard 2715, and an in-home power line 2711. Further, by connecting the access power line communication modem 2702 with a PC 2701 via an Ethernet 2704, access to the Internet can be performed from the PC 2701.

Thus, by using the access power line communication modem, access to the Internet can be provided without withdrawing a cable or the like into a home. In addition, since the access power line communication modem 2702 is installed at any arbitrary outlet in a home, the degree of freedom of installing is higher than that of ADSL, FTTH, and the like.

FIG. 21 is a diagram illustrating an internal configuration of a general power line communication modem which is implemented as a bridge to Ethernet. In FIG. 21, the power line communication modem comprises an AFE (Analog Front End) 2801, a digital modulation section 2808, a communication control section 2809, and an Ethernet I/F section 2810. The AFE 2801 includes a BPF (Band-Pass Filter) 2802, an AGC (Automatic Gain Control) 2803, an A/D conversion section 2804, an LPF (Low-Pass Filter) 2805, a PA (Power Amplifier) 2806, and a D/A conversion section 2807. Hereinafter, an operation of the power line communication modem will be described.

Assuming that Ethernet frames are transmitted onto a power line, when an Ethernet frame arrives through an Ethernet 2811, the communication control section 2809 is notified of the arrival via the Ethernet I/F section 2810. The communication control section 2809 determines a state of a communication channel, and outputs frame data to the digital modulation section 2808 with appropriate timing. The digital modulation section 2808 performs error correction addition, encoding, framing, and the like to modulate the frame data into a transmission data sequence. The D/A conversion section 2807 converts the transmission data sequence from a digital signal to an analog signal. The PA 2806 amplifies the analog signal. The LPF 2805 cuts off signals other than communication band components from the amplified analog signal, and inputs only the communication band components onto a power line. Next, in the case of reception from a power line, the BPF 2802 extracts a signal in a communication band. The AGC 2803 amplifies the extracted signal. The A/D conversion section 2804 converts the amplified analog signal into digital data. The digital modulation section 2808 performs frame synchronization detection, equalization, decoding, error correction, and the like with respect to the digital data to demodulate the digital data and notifies the communication control section 2809 of the resultant data as reception data. Thereafter, the reception data is transmitted as an Ethernet frame from the Ethernet I/F section 2810 to the Ethernet 2811.

Although the first-generation technology for high-speed power line communication is intended to be applied to best-effort applications, such as mailing and Web access on the Internet, power line communication for which outlets are provided everywhere in a home (i.e., wiring is not newly required) has potential to allow VoIP and video distribution, which are becoming more digital, to be used everywhere in a home.

However, in the case of VoIP, a sense of discomfort occurs as a delay time increases in voice signals. Therefore, a packet whose transmission delay exceeds a predetermined level is discarded. The packet discarding leads to loss of audio information. As the frequency of the packet discarding increases, discontinuity or noise occurs in audio. On the other hand, in the case of video distribution, a large amount of data needs to be communicated. For example, in the case of high-definition video, the data amount per second is as large as 24 Mbits. Such a large amount of data needs to be transmitted by an apparatus with a delay time which is within a tolerable range. This quality requirement for transmission of AV data is called AV-QoS, which is generally defined by an average transmission rate, a delay time, jitter, or the like.

Conventionally, as a technique of simultaneously achieving both power line communication satisfying AV-QoS and best-effort power line communication, a hybrid medium access control method of TDMA (Time Division Multiple Access) and CSMA (Carrier Sense Multiple Access) has been proposed. FIG. 22 illustrates an example of the conventional hybrid medium access control method.

In FIG. 22, the power line communication system which is designed to satisfy AV-QoS is composed of one terminal having a master function (master terminal) and one or more terminals having a slave function (slave terminals). The master terminal transmits a beacon 1201 at a predetermined time. The predetermined time is referred to as a beacon cycle. As the beacon cycle decreases, a data delay can be suppressed to a smaller level, but a data amount transmitted by one packet decreases, so that the proportion of overhead, such as header information and the like, increases, resulting in a decrease in transmission efficiency. In general, the beacon cycle is set to be about 10 msec to about 100 msec in view of a delay time requirement and transmission efficiency of a transmission signal. Also, in the beacon, time regions in which communication is permitted for the respective terminals are described. In the example of FIG. 22, terminals #1 to #3 are permitted for respective predetermined times. Also, the master terminal allocates a CSMA period, following TDMA in which transmission is controlled every a predetermined time. During the period, a terminal having a transmission signal acquires a transmission right using a predetermined algorithm to transmit data. Therefore, the period is suitable for transmission of conventional Internet data, such as mailing and Web access, in which a predetermined amount of data is not generated at every predetermined time. However, once data transmission is started, data communication is continued in a burst manner. By separating from the TDMA region in this manner, it is possible to avoid local interruption of data transmission in the TDMA region.

Next, a coexistence control for power line communication will be described.

As described above, various forms of power line communication from a home to an access network have been considered, and various types of power line communication techniques have been developed, but there is currently no unified power line communication scheme. However, in-home power lines are all connected together in a distribution switchboard, and are also connected with an outdoor power line. Therefore, if power line communication modems for different schemes are used in the same home and outside the home (close to the home), a communication signal from one modem is likely to reach other modems. A power line communication modem for one scheme cannot demodulate a signal of another scheme which a power line communication modem for the other scheme transmits in a communication channel, i.e., the signal of the other scheme is only noise. Therefore, if two different communication schemes are simultaneously performed, the two schemes interfere with each other, so that neither of the two schemes achieves communication, resulting in a significant decrease in communication speed, or the like.

As a method for avoiding such a problem, it is considered that a unified standard scheme for power line communication is created. However, a huge time and cost are required to create a new standard, so that such a standard will not be obtained in the near future.

To avoid this, for example, Japanese Patent Laid-Open Publication No. 2002-368831 proposes a method for controlling data transmission of each power line modem when a plurality of power line modems having different data communication schemes are present on the same power line. FIG. 23 is a diagram for explaining this conventional technique.

In FIG. 23, for example, it is assumed that a selector 61 provided in a management processor 6 selects power line modems 4a to 4m employing a scheme B as transmission-permitted power line modems. In this case, a message generator 62 generates a transmission-permitting message which indicates permission of transmission to the power line modems 4a to 4m employing the scheme B, and a transmission-forbidding message which indicates forbiddance of transmission to power line modems 3a to 3m employing a scheme A. Thereafter, a power line modem 3n employing the scheme A transmits the transmission-forbidding message to the power line modems 3a to 3m employing the scheme A, and a power line modem 4n employing the scheme B transmits the transmission-permitting message to the power line modems 4a to 4m employing the scheme B.

FIG. 24 illustrates an operation in which two in-home systems coexist on the same power line in a time division manner using the communication system of FIG. 23. In FIG. 24, the management processor 6 outputs a coexistence signal 1401 which permits an in-home communication system 1 to perform transmission, and a coexistence signal 1402 which permits an in-home communication system 2 to perform transmission. By periodically repeating the operation using predetermined TDM, equal time slots are allocated for the in-home communication system 1 and the in-home communication system 2 without collision.

However, in the above-described conventional system, AV-QoS cannot be secured between a plurality of communication systems. Specifically, a communication system which transmits the coexistence signals 1401 and 1402 is different from a communication which tries to secure AV-QoS in a home. When different communication systems transmit a coexistence signal, clocks of the communication systems are not in synchronization with each other, and therefore, the beacon 1201 of the in-home communication system which should secure AV-QoS has a phase that is different from that of the coexistence signal, so that the phase difference increases over time.

Therefore, as illustrated in FIG. 24, even if the beacon 1201 is transmitted in a first slot of the in-home communication system 1 during a coexistence cycle immediately after a given coexistence signal, a beacon is shifted afterward in a slot of the in-home communication system 1 during a coexistence cycle after a lapse of some cycles. Therefore, a transmission time of a terminal in the in-home communication system 1 which starts transmission at a time designated by the beacon 1201 is shifted into a time slot of another coexisting system, so that both systems collide, and therefore, a coexistence relation cannot be maintained. In other words, AV-QoS cannot be maintained.

Note that, since an access communication system provides service to a number of homes, the access communication system functions as a master of a coexistence control and causes in-home communication systems to coexist with its timing. Therefore, it is relatively easy to achieve QoS in the access service. Also, even when an in-home communication system performs an access control using best-effort CSMA, it is possible to easily control transmission in accordance with an instruction of a coexistence control section possessed by its terminal.

SUMMARY OF THE INVENTION

Therefore, an object of the present invention is to provide a communication apparatus and a coexistence method in which coexistence can be achieved while satisfying AV-QoS in a plurality of different communication systems, particularly, in a communication system in which it is difficult to determine the presence or absence of a communication signal using only a carrier sense mechanism (e.g., power line communication).

The present invention is directed to a communication apparatus and a method for allocating a transmission band so as to secure QoS based on a reference signal, the communication apparatus belonging to one or more in-home communication systems which perform communication within a limited region or an access communication system which connects the limited region to a wide area network, the in-home communication systems and/or the access communication system coexisting on the same communication medium by time division.

To achieve the object, the communication apparatus of the present invention comprises a power reference point extracting section for extracting a reference point of a commercial power supply on a power line, a TDM coexistence control section for transmitting/receiving a coexistence signal in synchronization with the reference point to control coexistence with another communication system by time division, and a transmission timing determining section for determining timing of transmitting the reference signal in synchronization with the reference point.

Preferably, the power reference point extracting section defines a zero-crossing point of the commercial power supply as the reference point, or defines, as the reference point, a point which is phase-shifted by an integral multiple of 60 degrees from the zero-crossing point of the commercial power supply. Typically, the reference signal is a beacon.

According to the present invention, both a band setting method for notifying of transmission/reception times which are occupied and can be used by terminals, using a beacon, at once, and a method for causing a plurality of communication systems having different communication methods to coexist by time division, can be simultaneously employed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 12 to 14 are diagrams for describing a conventional problem corresponding to a second embodiment of the present invention.

FIG. 24 is a timing diagram illustrating a coexistence process which is performed by the conventional communication system of FIG. 23.

DETAILED DESCRIPTION OF THE INVENTION
PREFERRED EMBODIMENTS

Hereinafter, embodiments of the present invention will be described with reference to the accompanying drawings. Note that the following embodiments will be described, assuming that a communication medium is a power line, though the communication medium may be radio waves or a wired medium other than power lines.

First Embodiment

In a first embodiment, an example in which three communication systems are caused to coexist using Time Division Multiplexing (TDM), will be described.

Figure 1:
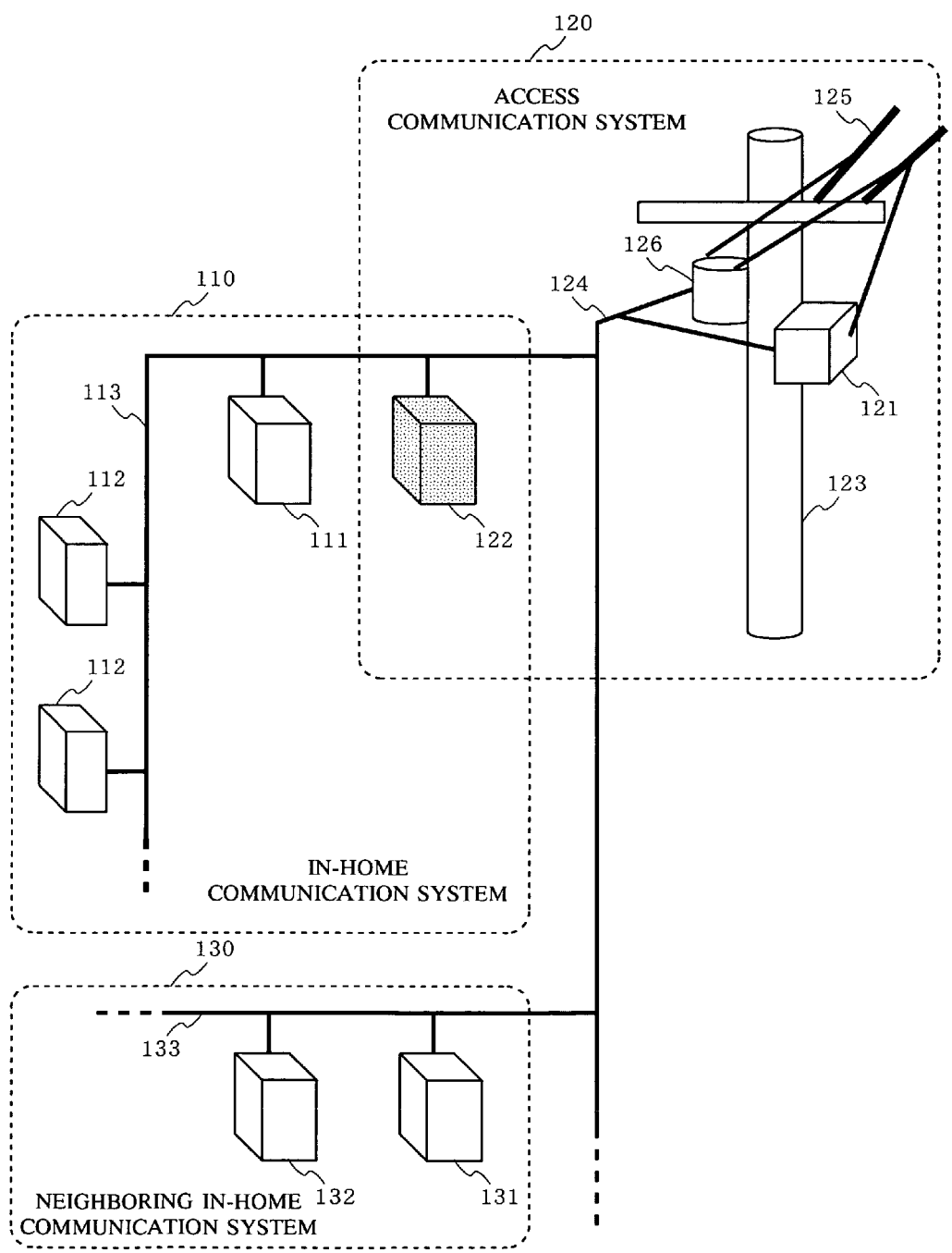
FIG. 1 is a diagram schematically illustrating a configuration of a communication system which employs a communication apparatus according to a first embodiment of the present invention.

FIG. 1 is a diagram schematically illustrating a configuration of a communication system which employs a communication apparatus according to the first embodiment of the present invention. In the first embodiment, there are three communication systems, i.e., in-home communication systems 110 and 130 and an access communication system 120. Note that the configuration of the communication system of FIG. 1 is only for illustrative purposes. The in-home communication system 110 and the in-home communication system 130 may be located in the same home, and there may be three or more in-home communication systems.

The in-home communication system 110 is a power line communication system which utilizes a power line 113 provided in a home, and is composed of an in-home-system master station 111 which controls coexistence of the in-home communication system 110 and the access communication system 120, and an in-home-system slave station 112 other than the in-home-system master station 111. The in-home-system master station 111 is a communication apparatus which has a function of receiving a coexistence signal which is transmitted by a station belonging to the access communication system 120, and controlling the in-home-system slave station 112. In general, only one in-home-system master station 111 is provided in a home, and may be fixedly specific or may be dynamically determined or changed during an operation. The in-home-system slave station 112 is a communication apparatus which is operated in a control of the in-home-system master station 111, and one or more in-home-system slave stations 112 are provided in one in-home communication system 110.

The in-home communication system 130 is a power line communication system which utilizes a power line 133 provided in a home, and is composed of an in-home-system master station 131 which controls coexistence of the in-home communication system 130 and the access communication system 120, and an in-home-system slave station 132 other than the in-home-system master station 131. The in-home-system master station 131 and the in-home-system slave station 132 have the same configuration, function and role as those of the in-home-system master station 111 and the in-home-system slave station 112 of the in-home communication system 110, respectively.

The access communication system 120 is a power line communication system which utilizes the in-home power line 113, a low voltage power distribution line 124 provided from the home to a pole transformer 126 provided on a utility pole 123, and an intermediate voltage power distribution line 125 from the pole transformer 126 to an electric power substation (not shown). Of communication apparatuses belonging to the access communication system 120, there are an access-system master station 121, and an access-system in-home apparatus (hereinafter referred to as an access-system slave station) 122 provided in the home, which are located within a range which causes interference with the in-home communication system 110. The access-system master station 121 may be provided as a communication apparatus separated from the pole transformer 126 as illustrated in FIG. 1, or may be incorporated in the pole transformer 126. Alternatively, in view of, for example, the case where a power line is buried under the earth, the access-system master station 121 may be incorporated in an appropriate apparatus other than the pole transformer 126.

Note that, for example, the access-system slave station 122 can also be provided on the low voltage power distribution line 124 outside the home, and a communication function of the in-home communication system 110 can be assigned to the access-system slave station 122. Although not illustrated in FIG. 1, the in-home-system master station 111 and the access-system slave station 122 are connected to each other via Ethernet, wireless LAN, or the like, or alternatively, for example, the in-home-system master station 111 and the access-system slave station 122 are provided in a single apparatus, thereby making it possible to achieve intercommunication between the in-home communication system 110 and the access communication system 120.

In the first embodiment, communication systems 110 to 130 can each have a function capable of using a frequency band of, for example, 2 MHz to 30 MHz. The frequency band is used so as to transmit and receive a coexistence signal for coexistence of the communication systems 110 to 130 without interference with each other, and perform data communication in each communication system. The access communication system 120 can use, with priority, the whole or a part of a time for which the frequency band is used. The in-home communication systems 110 and 130 detects a time which is used by the access communication system 120, using a coexistence signal (described below), and shares a time which is not used by the access communication system 120, by time division using the coexistence signal (described below). When the access communication system 120 is not present, the in-home communication systems 110 and 130 can use a time, which is divided into two.

Next, referring to FIGS. 2A to 2C and 3, a configuration and transmission/reception of a coexistence signal of each station will be described in detail, where the in-home communication system 110 of FIG. 1 is a communication system which secures its QoS using a function of outputting a periodic reference signal, and the access communication system 120 and the neighboring in-home communication system 130 do not support QoS. Note that, in embodiments below, examples in which the periodic reference signal output by the in-home communication system 110 is a beacon, will be described.

Figure 2A:
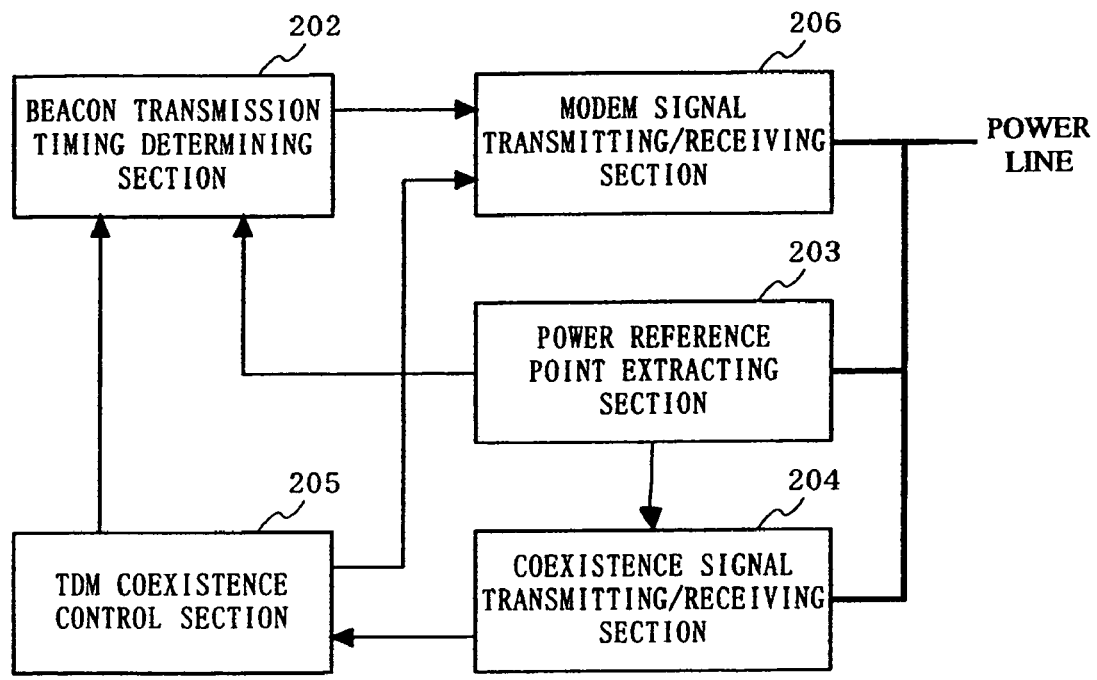
FIG. 2A is a diagram illustrating a detailed exemplary configuration of an in-home-system master station 111 of an in-home communication system 110.

FIG. 2A is a diagram illustrating a detailed exemplary configuration of the in-home-system master station 111 of the in-home communication system 110. The in-home-system master station 111 comprises a beacon transmission timing determining section 202, a power reference point extracting section 203, a coexistence signal transmitting/receiving section 204, a TDM coexistence control section 205, and a modem signal transmitting/receiving section 206. Although the case where a master station which controls a coexistence signal also has a function of transmitting a QoS beacon will be described in this embodiment, the beacon function may be possessed by an apparatus which is different from the master station which controls a coexistence signal.

Figure 2B:
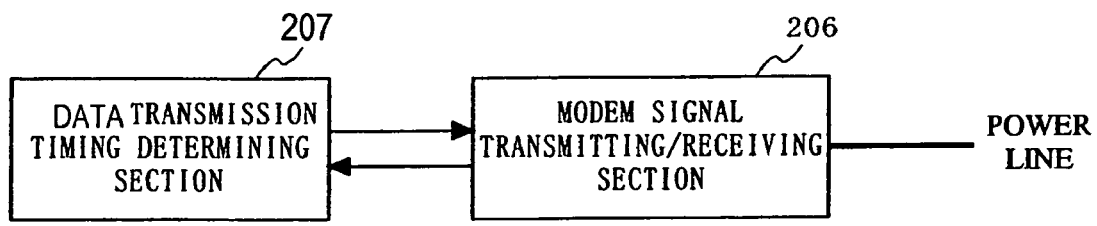
FIG. 2B is a diagram illustrating a detailed exemplary configuration of an in-home-system slave station 112 of the in-home communication system 110.

FIG. 2B is a diagram illustrating a detailed exemplary configuration of an in-home-system slave station 112 of the in-home communication system 110. The in-home-system slave station 112 comprises a data transmission timing determining section 207 and a modem signal transmitting/receiving section 206.

Figure 2C:
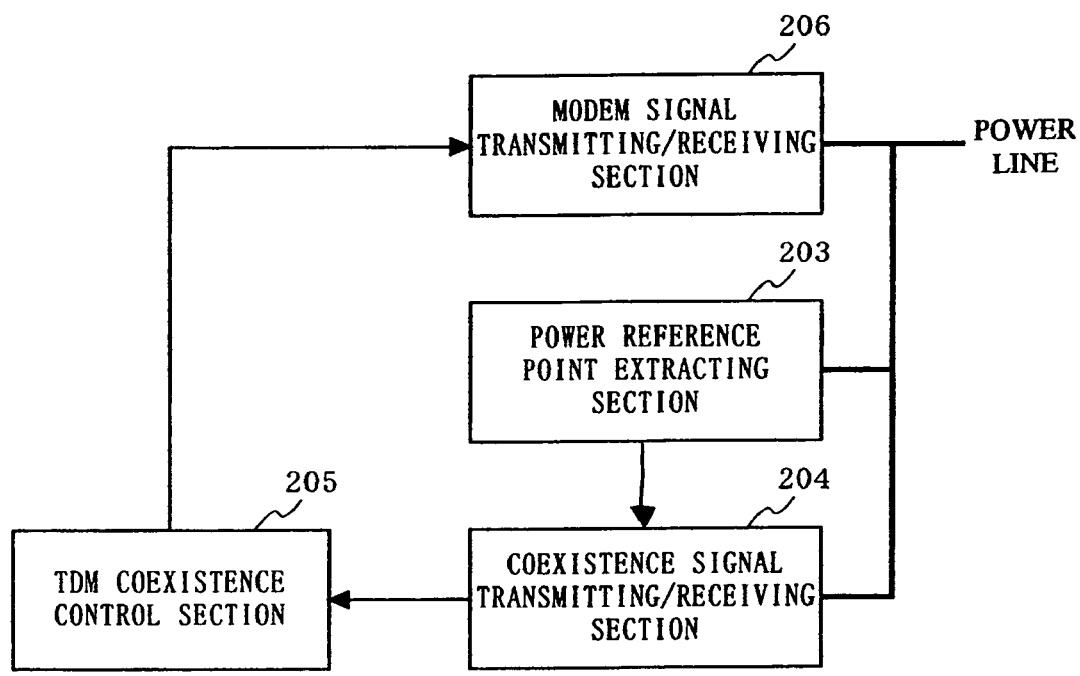
FIG. 2C is a diagram illustrating detailed exemplary configurations of an access-system slave station 122 of an access communication system 120, and an in-home-system master station 131 and an in-home-system slave station 132 of an in-home communication system 130.

FIG. 2C is a diagram illustrating detailed exemplary configurations of an access-system slave station 122 of the access communication system 120 and an in-home-system master station 131 and an in-home-system slave station 132 of the in-home communication system 130. Each of these stations comprises a power reference point extracting section 203, a coexistence signal transmitting/receiving section 204, a TDM coexistence control section 205, and a modem signal transmitting/receiving section 206.

Figure 3:
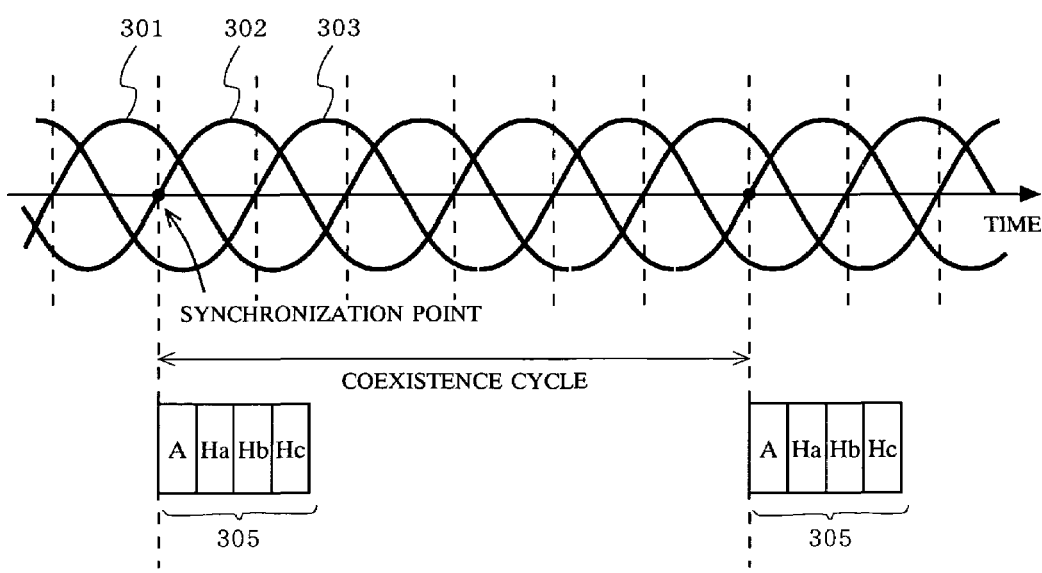
FIG. 3 is a timing diagram illustrating operations of a power reference point extracting section 203 and a coexistence signal transmitting/receiving section 204.

FIG. 3 is a timing diagram for describing operations of the power reference point extracting section 203 and the coexistence signal transmitting/receiving section 204. In the example of FIG. 3, a three-phase alternating power supply, which is mainly used in Europe, is described. The present invention also has an effect with respect to a two-phase three-wire system (Japan, USA, and Asia) and power lines in all other countries.

Three alternating power supplies 301 to 303 illustrated in FIG. 3 have phases which are shifted by 60 degrees with respect to each other. The multi-phase power system is divided and distributed into wires having respective phases in a home, so that an electronic apparatus can detect only power having any one of the phases. Therefore, a phase difference occurs between electronic apparatuses connected to wires having different phases, even when a zero-crossing point is selected as a reference point. Therefore, each electronic apparatus uses a zero-crossing point detected by itself as a reference point, and selects a reference point every 60 degrees from that reference point, thereby making it possible to cause the reference point to coincide with those of all electronic apparatuses.

Figure 4:
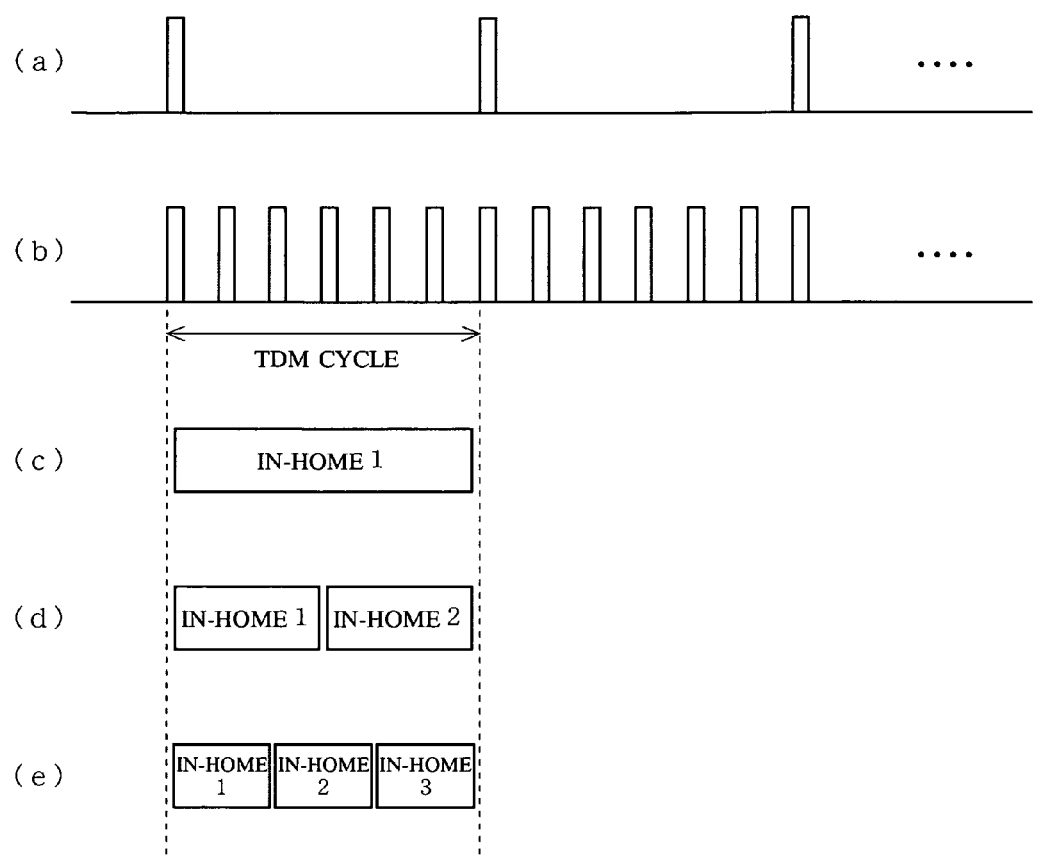
FIG. 4 is a diagram illustrating timing of each signal where a zero-crossing point is used as a reference point.

This situation is illustrated in FIG. 4. Portion (a) of FIG. 4 indicates an internal signal of the power reference point extracting section 203 of FIG. 2, where a pulse is generated per zero-crossing point of one alternating signal. Portion (b) of FIG. 4 indicates an output signal of the power reference point extracting section 203, where a pulse is generated every 60 degrees using the internal signal of portion (a) as a reference.

The coexistence signal transmitting/receiving section 204 notifies other communication systems of the presence of a communication system to which the coexistence signal transmitting/receiving section 204 belongs, and is also notified of the presence of the other communication systems, where time slots which are used in common by coexisting communication systems are defined using the reference points. Here, an example in which the three communication systems including an access communication system use a TDM coexistence signal to achieve coexistence, will be described. Note that the coexistence signal may be a FDM scheme or a hybrid scheme of FDM and TDM.

A coexistence signal 305 is disposed using a synchronization point as a reference, and a plurality of slots are set, depending on times from the synchronization point. Each communication system, when using a power line, transmits a specific signal in a corresponding slot. The specific signal may be, for example, an OFDM signal represented by an existing function. A communication system which knows the function can detect the specific signal and know the use of a slot. Each of the communication systems which coexist tries to detect the coexistence signal 305 at every reference point. When the coexistence signal 305 cannot be detected, the communication system determines that there is not another coexisting communication system, and transmits a coexistence signal with timing of a reference point every a predetermined coexistence cycle. On the other hand, when the coexistence signal 305 has been detected, the communication system determines a coexistence cycle, and a TDM cycle and an ordinal position (TDM slot) thereof. The TDM coexistence control section 205 is notified of the information of the detected coexistence signal 305.

When the presence of only one communication system has been detected in the coexistence signal 305, the communication system can occupy all the time of a TDM cycle (TDM slot) ((c) of FIG. 4). When the presence of two communication systems has been detected in the coexistence signal 305, the two communication systems can share the time of a TDM cycle, which is divided into two, for example ((d) of FIG. 4). When the presence of three communication systems has been detected in the coexistence signal 305, the three communication systems can share the time of a TDM cycle, which is divided into three, for example ((e) of FIG. 4). Note that, if it is previously defined as settings that ½ of the total time is used by the access communication system, and the remaining time is equally divided and used by the in-home communication systems, for example, division/allocation is performed in accordance with the settings.

When the TDM coexistence control section 205 has determined a TDM slot which is used by a communication system to which the TDM coexistence control section 205 belongs, the modem signal transmitting/receiving section 206 transmits a modem signal only to the TDM slot, and performs reception only in the TDM slot.

Thereby, the beacon transmission timing determining section 202 of the in-home-system master station 111 can previously know information for synchronization with other coexisting communication systems and the number of communication systems to coexist, more specifically, transmission timing of a communication system to which the in-home-system master station 111 belongs, from the power reference point extracting section 203 and the TDM coexistence control section 205.

Figure 5:
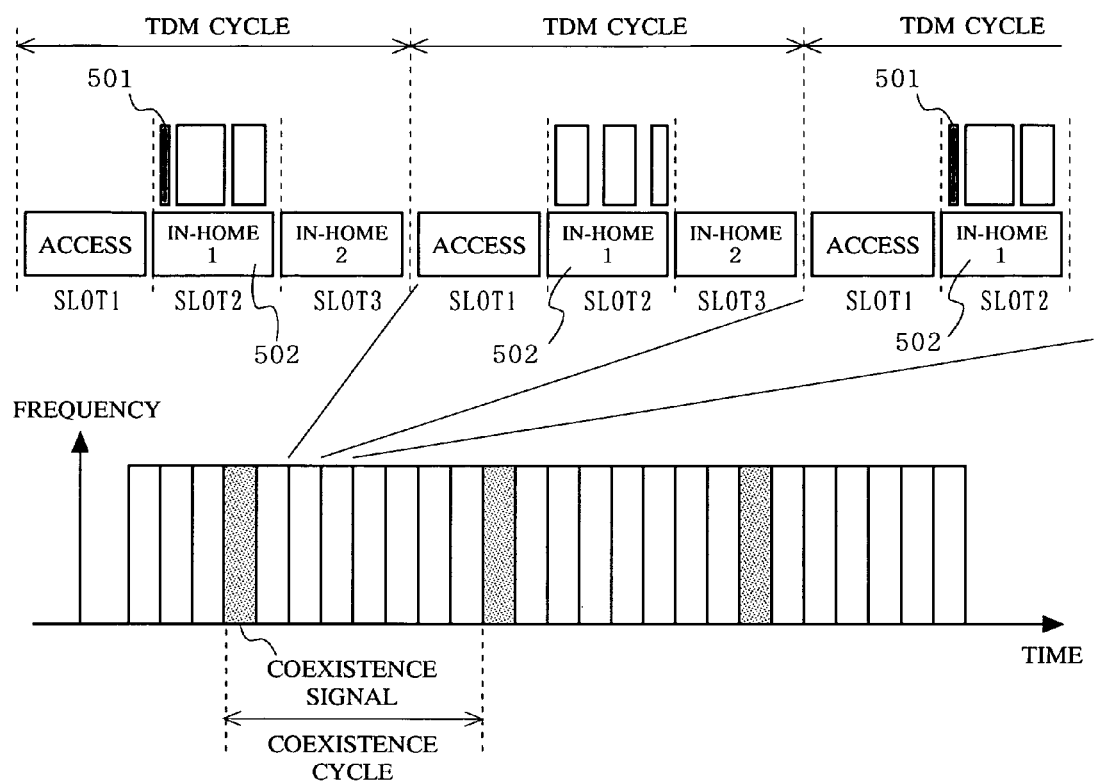
FIG. 5 is a timing diagram for describing a coexistence process performed by the communication system of the first embodiment.

It should be noted that, since the timing of the TDM cycle is in synchronization with the power system, by synchronizing the beacon transmission timing with the power system based on information from the power reference point extracting section 203, the transmission time allocation of FIG. 5 can be previously determined and can be easily set in a beacon. In FIG. 5, since the transmission time of the communication system to which the in-home-system master station 111 belongs can be previously set with respect to a synchronized clock, it is possible to notify of timing with which a slave station of the communication system to which the in-home-system master station 111 belongs performs transmission/reception over a plurality of time-divided TDM slots in a beacon 501. Therefore, the slave station can perform transmission/reception in a TDM slot 502 set in the communication system to which the in-home-system master station 111 belongs only by performing transmission/reception at a time designated by its master station.

Figure 6A:
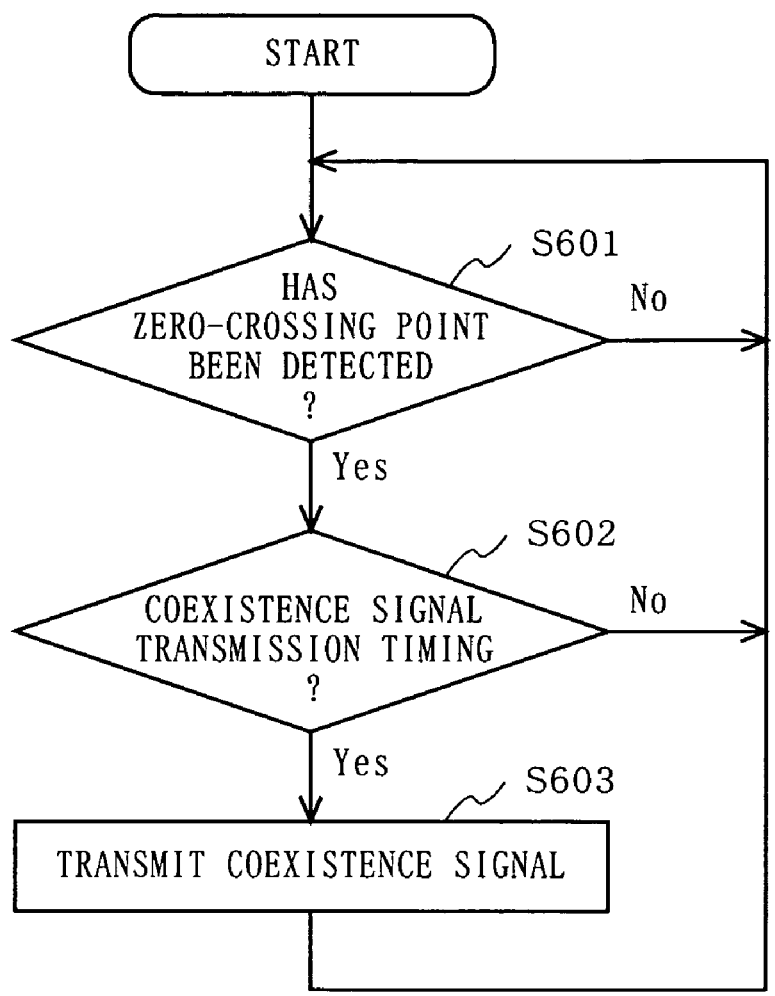
FIG. 6A is a flowchart for describing an operation of a coexistence process in a stationary state of the in-home-system master station 111.
Figure 6B:
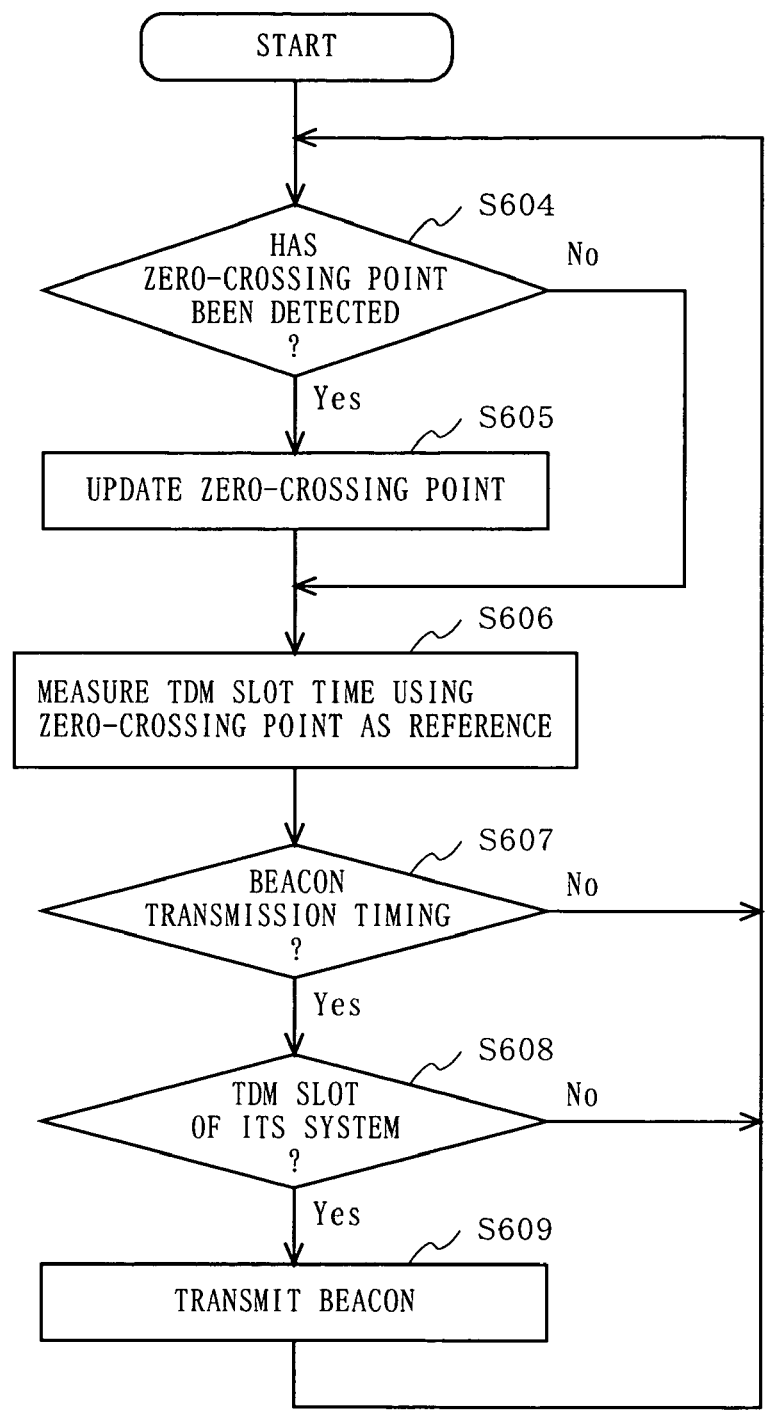
FIG. 6B is a flowchart for describing an operation of a process of measuring a TDM slot for coexistence and a process of transmitting a beacon in the stationary state of the in-home-system master station 111.

Here, an operation flow of a coexistence process in a stationary state of the in-home-system master station 111 is illustrated in FIG. 6A, and a process of counting the number of TDM slots for coexistence and transmitting a beacon is illustrated in FIG. 6B. As used herein, the stationary state refers to a normal operation state excluding states during activation of a station, an abnormal operation and the like. In FIG. 6A, data communication, apparatus control and the like in the stationary state, which relate to the coexistence process, are not illustrated.

In FIG. 6A, the in-home-system master station 111, when detecting a zero-crossing point (step S601), determines whether or not it is timing of transmitting a coexistence signal (step S602). When it is not timing of transmitting a coexistence signal, the in-home-system master station 111 continues to perform detection of a zero-crossing point. When it is timing of transmitting a coexistence signal, the in-home-system master station 111 transmits a coexistence signal (step S603).

In FIG. 6B, the in-home-system master station 111, when detecting a zero-crossing point (step S604), updates the zero-crossing point (step S605) before measuring a time of a TDM slot with reference to the zero-crossing point (step S606). On the other hand, when not detecting a zero-crossing point, the in-home-system master station 111 does not update a zero-crossing point, and continues to measure a time of a TDM slot with reference to a previously detected zero-crossing point (step S606). The above-described operation is repeated until a beacon transmission time (step S607). When the beacon transmission time is reached, the in-home-system master station 111 determines whether or not a TDM slot at that time is a TDM slot which the communication system to which the in-home-system master station 111 belongs is permitted to use (step S608). When determining that the TDM slot at that time is a TDM slot of the communication system to which the in-home-system master station 111 belongs, the in-home-system master station 111 transmits a beacon (step S609). When determining that the TDM slot at that time is not a TDM slot of the communication system to which the in-home-system master station 111 belongs, beacon transmission is not performed, and the above-described steps S604 to S606 are repeated.

Figure 7:
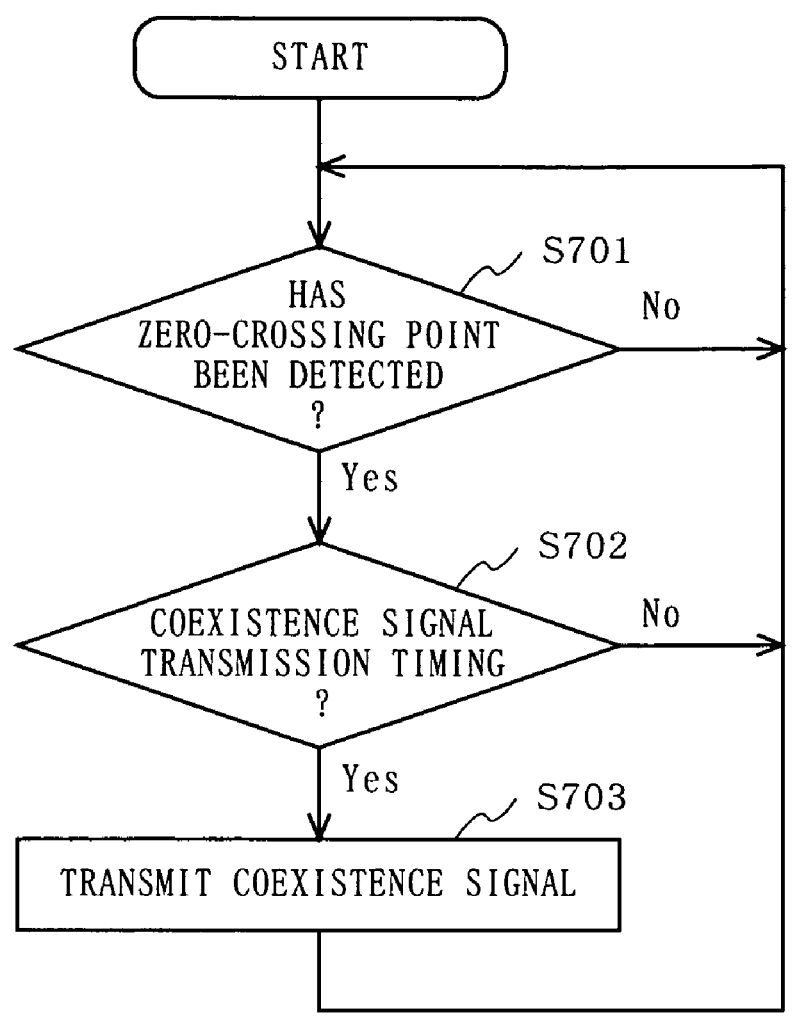
FIG. 7 is a flowchart for describing an operation of a coexistence process in a stationary state of the access-system slave station 122, the in-home-system master station 131, and the in-home-system slave station 132.

Further, an operational flow related to a coexistence process in a stationary state of the access-system slave station 122, the in-home-system master station 131 and the in-home-system slave station 132, is indicated in FIG. 7. The access-system slave station 122, the in-home-system master station 131, and the in-home-system slave station 132, when detecting a zero-crossing point (step S701), determine whether or not it is timing of transmitting a coexistence signal (step S702). When it is not timing of transmitting a coexistence signal, the access-system slave station 122, the in-home-system master station 131, and the in-home-system slave station 132 continue to perform detection of a zero-crossing point. When it is timing of transmitting a coexistence signal, the access-system slave station 122, the in-home-system master station 131, and the in-home-system slave station 132 transmit a coexistence signal (step S703).

Next, a specific example in which a coexistence signal is extended will be described.

Figure 8:
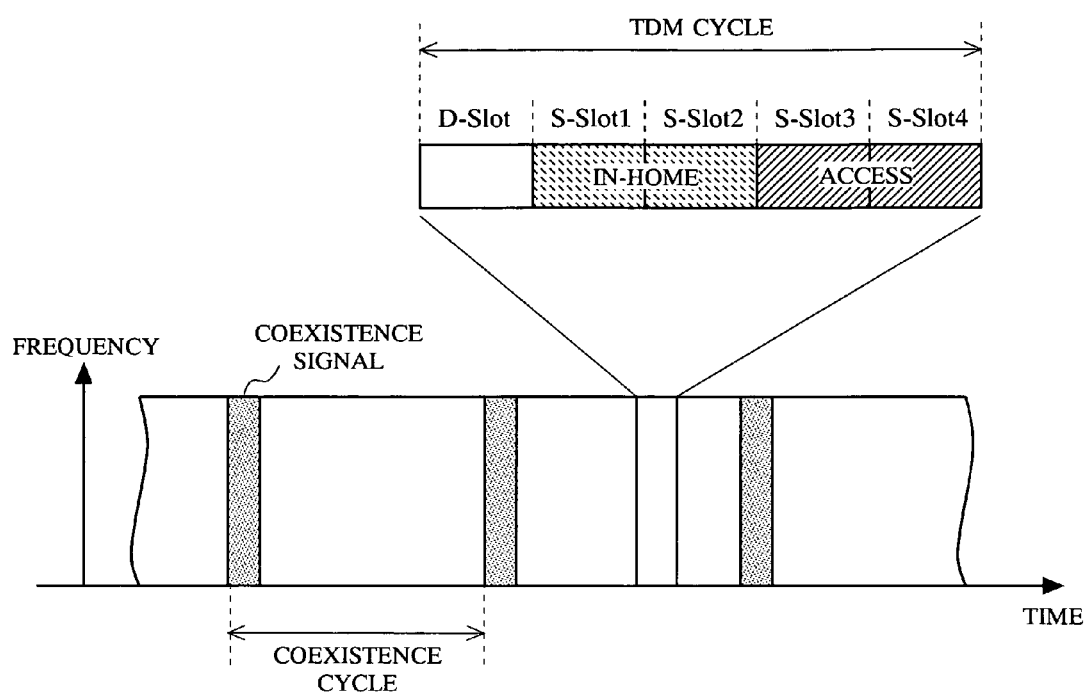
FIGS. 8 to 10 are timing diagrams for describing another coexistence process performed by the communication system of the first embodiment.

FIG. 8 is a diagram illustrating timing of coexistence signals, TDM slots, beacons, and data slots when the access communication system 120 and the in-home communication systems 110 and 130 are caused to coexist by time division multiplexing. In FIG. 8, five TDM slots (D-Slot and S-Slots 1 to 4) are set in a TDM cycle. The S-Slots 3 and 4 are slots occupied by the access communication system 120. The S-Slots 1 and 2 are slots which can continue to be used by any of the access communication system 120 and the in-home communication systems 110 and 130 by means of declaration. The D-Slot is a slot which can be alternately used by a maximum of three communication systems which declare to use the D-Slot in a coexistence signal. The D-Slot is a TDM slot which is introduced so as to dynamically and efficiently handle data which is irregularly generated in a burst manner. Note that, during a period of time in which only one communication system declares use of the D-Slot, the D-Slot has the same definition as that of the S-Slot.

Figure 9:
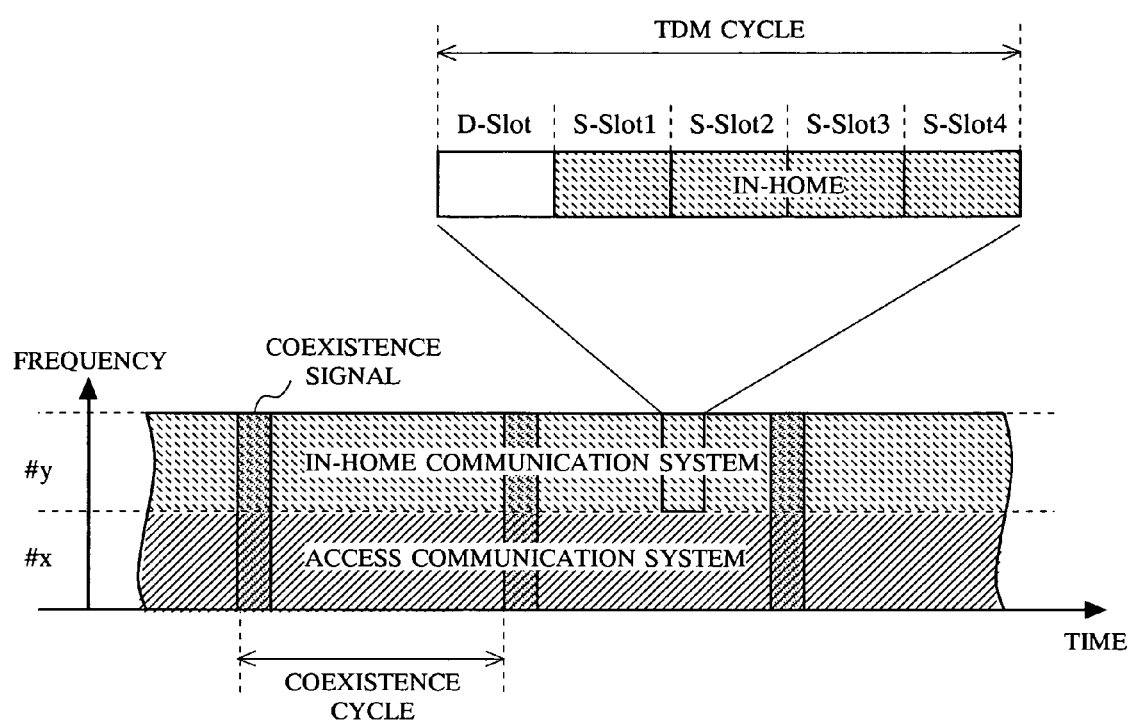
Figure 10:
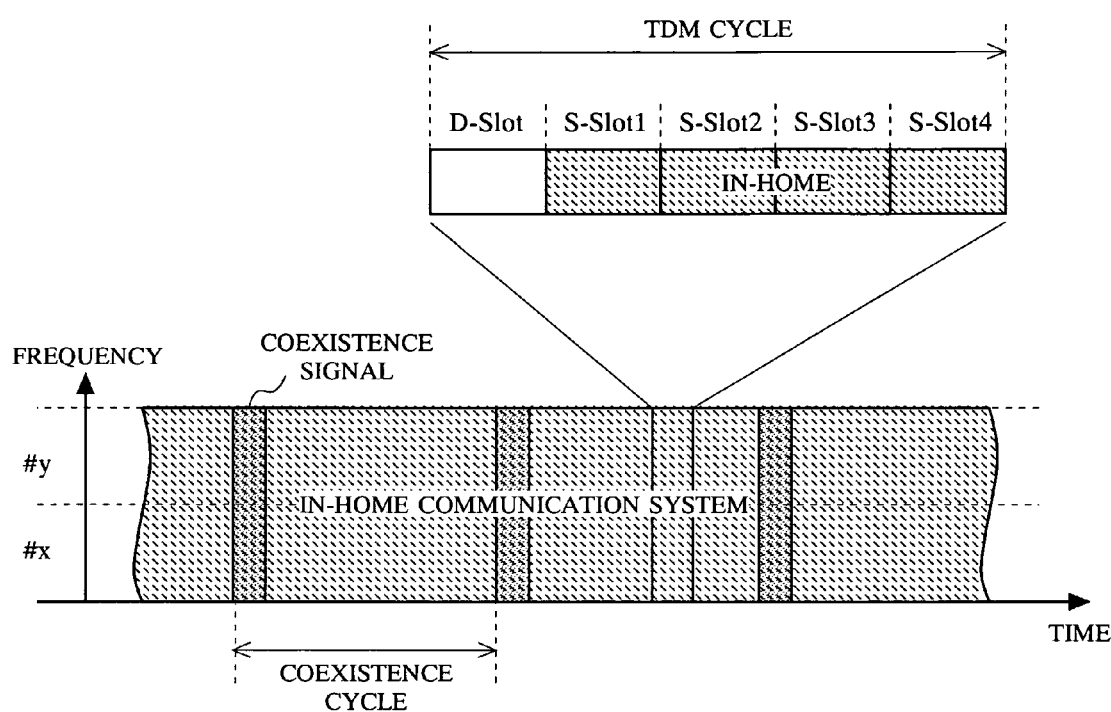

FIG. 9 is a diagram illustrating timing of coexistence signals, TDM slots, beacons, and data slots when the access communication system 120 and the in-home communication systems 110 and 130 are caused to coexist by frequency division multiplexing. In FIG. 9, along with the above-described coexistence control by TDM, it is defined that the access communication system 120 uses a channel #X with priority, and the in-home communication systems 110 and 130 use a channel #Y. In this case, if the access communication system 120 is not present, the channel #X can also be used by the in-home communication systems 110 and 130 (see FIG. 10).

Figure 11:
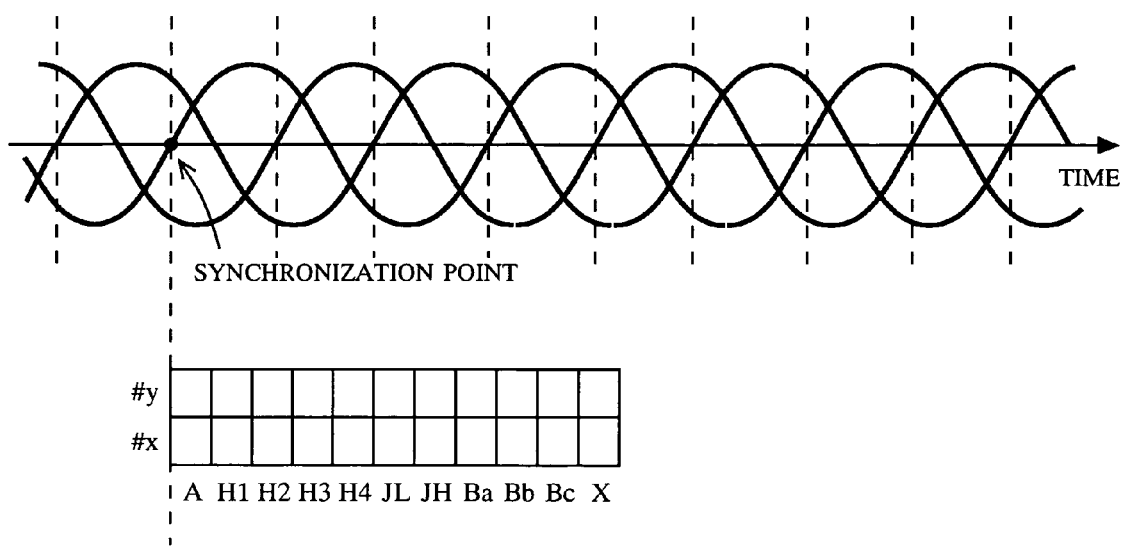
FIG. 11 is a diagram illustrating an exemplary format of a coexistence signal.

FIG. 11 is a diagram illustrating an exemplary format of a coexistence signal which is extended so as to support the above-described coexistence method. The coexistence signal of FIG. 11 is composed of slots A, H1 to H4, JL, JH, Ba to Bc, and X defined by time division, and channels #X and #Y defined by frequency division. The slots H1 to H4 correspond to the S-Slots 1 to 4. The slots JL and JH are used when a communication system which wishes to newly use an S-Slot issues a Join request with respect to a communication system which has already used an S-Slot. For example, when a communication system A is using all the S-Slots 1 to 4, the slots H1 to H4 of the coexistence signal are already used. Therefore, another communication system B which subsequently wishes to coexist transmits a signal in the slots JL and JH, but not in the slots H1 to H4, thereby requesting release of a slot with respect to the communication system A. The slot JL and the slot JH are different in priority. The communication system A compares the priority of a requested slot with its priority, to determine by itself how many S-Slots are to be released. The slots Ba to Bc are slots for controlling a D-Slot. The slot X is a slot which requests resynchronization of coexistence signal cycles between communication systems. The method for controlling the slots Ba to Bc and X are not subjects of the present invention and will not be described.

As described above, the communication system and the coexistence method of the first embodiment of the present invention which employ a communication apparatus, can simultaneously employ both a band setting method for notifying of transmission/reception times which are occupied and can be used by terminals, using a beacon, at once, and a method for causing a plurality of communication systems having different communication methods to coexist by time division.

Second Embodiment

A method for causing a plurality of communication systems to coexist by time division performs a control based on a coexistence signal which each communication system transmits to other communication systems. Therefore, two communication systems between which a signal is not directly communicated may be caused to coexist and be in synchronization with each other via another communication system intervening therebetween.

However, there is also an apparatus which is powered only when it is used as well as an apparatus which is powered all the time, of electronic apparatuses belonging to an in-home communication system. Therefore, when the intervening communication system is powered OFF, the synchronization relationship between the two communication systems between which a signal is not directly communicated collapses. Therefore, when the intervening communication system is powered ON at the next time, a coexistence/synchronization control has to be performed from scratch. In other words, when a particular communication system is powered ON/OFF, the synchronization of the whole system may be disturbed.

Figure 12:
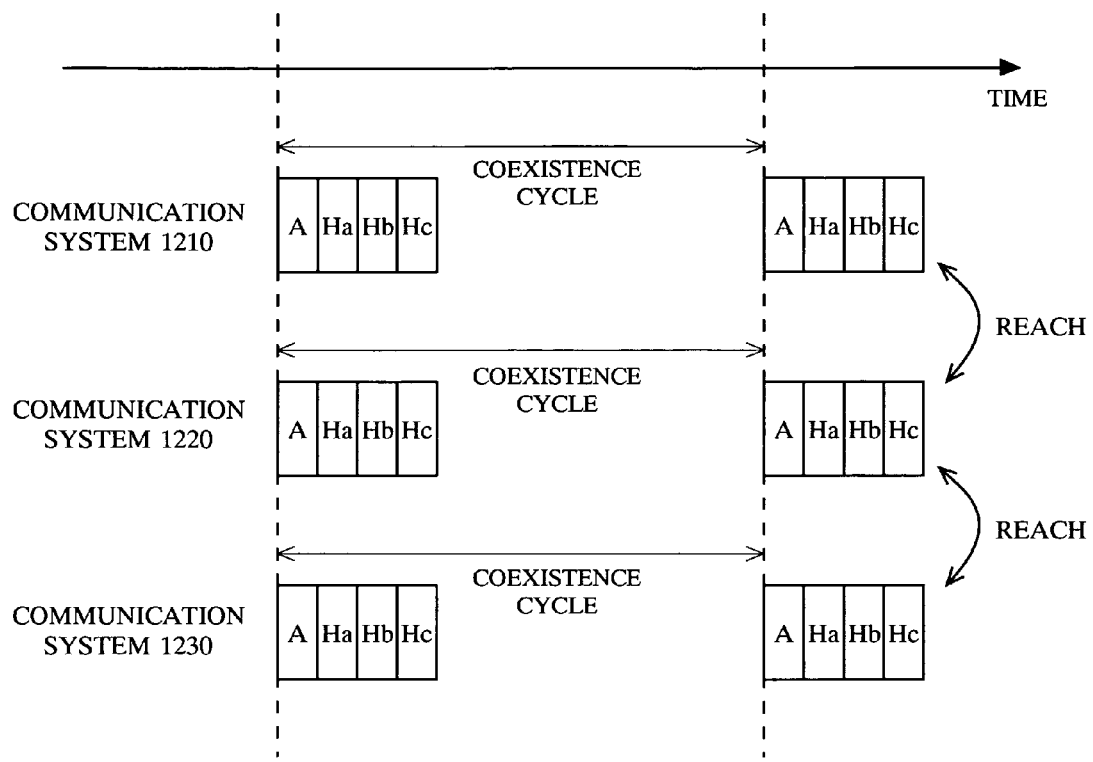
Figure 13:
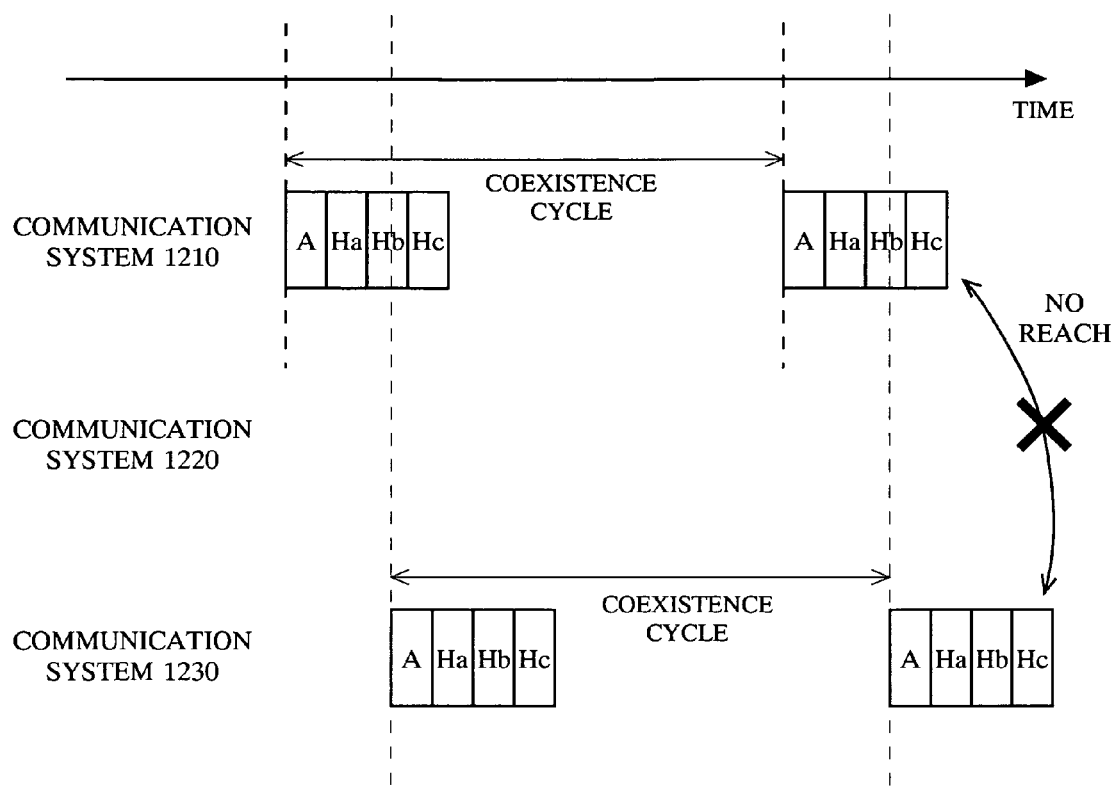

For example, as illustrated in FIG. 12, it is assumed that communication systems 1210 and 1230 are in synchronization with each other via a communication system 1220. In this situation, when the communication system 1220 is powered OFF, the communication systems 1210 and 1230 cannot mutually receive a coexistence signal which is transmitted from the other of them. Therefore, the communication systems 1210 and 1230 transmit a coexistence signal with respective separate timings. As a result, the coexistence signal transmission timings of the two communication systems 1210 and 1230 deviate from each other, depending on a difference in accuracy between clocks possessed by master stations of the two communication systems 1210 and 1230 (FIG. 13). Therefore, when the communication system 1220 is powered ON again in this situation and synchronizes with a coexistence signal of one of the two communication systems, the communication system 1220 interferes with the other communication system (FIG. 14).

Therefore, in a second embodiment, a technique which solves the above-described problem will be described.

Figure 15:
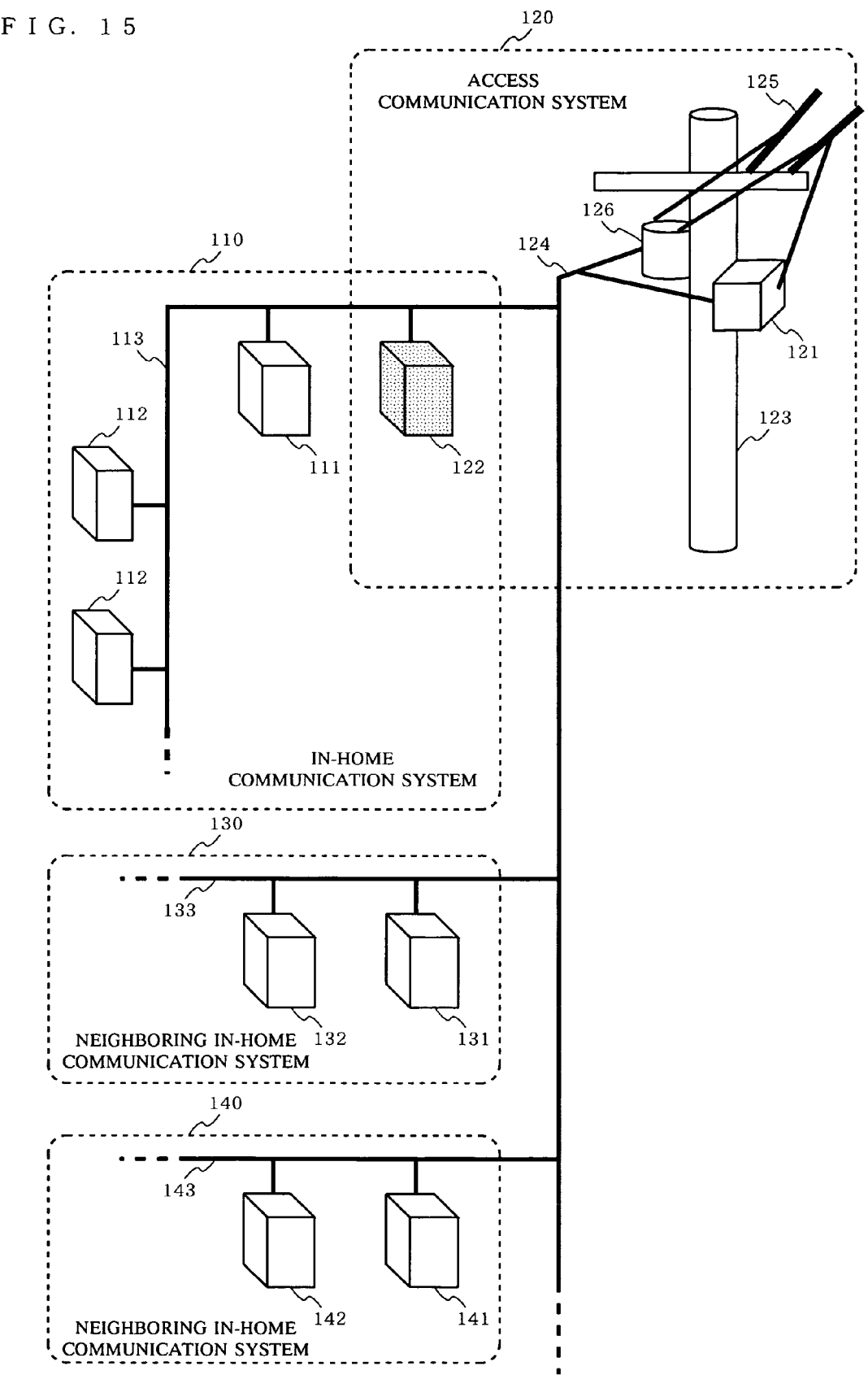
FIG. 15 is a diagram schematically illustrating a configuration of a communication system which employs a communication apparatus according to the second embodiment of the present invention.

FIG. 15 is a diagram schematically illustrating a communication system according to the second embodiment of the present invention which employs communication apparatuses. The communication system of the second embodiment has the same configuration as that of the communication system of the first embodiment, except that a neighboring in-home communication system 140 is added. The configuration of the communication system of FIG. 15 is only for illustrative purposes. Alternatively, the in-home communication system 110 and the in-home communication system 130 may be provided in the same home, or four or more in-home communication systems may be provided. Note that the same parts as those of the first embodiment will not be described.

The in-home communication system 140 is a power line communication system which utilizes a power line 133 wired in a home, and is composed of an in-home-system master station 141 which controls coexistence with the access communication system 120, and an in-home-system slave station 142 other than the in-home-system master station 141. The in-home-system master station 141 and the in-home-system slave station 142 have the same configurations, functions and roles as those of the in-home-system master station 111 and the in-home-system slave station 112 of the in-home communication system 110, respectively.

In this embodiment, the case where three communication systems (i.e., the in-home communication systems 110, 130 and 140) already establish a coexistence control relationship in accordance with the procedure described in the first embodiment, will be described. Also, the in-home communication system 140 and the in-home communication system 110 are assumed to have a relationship that a signal is not mutually communicated therebetween, for example, because the two systems are distant on a power line. This means that, if there is not the in-home communication system 130, the in-home communication system 110 and the in-home communication system 140 does not have a relationship that the two systems should coexist.

Figure 16:
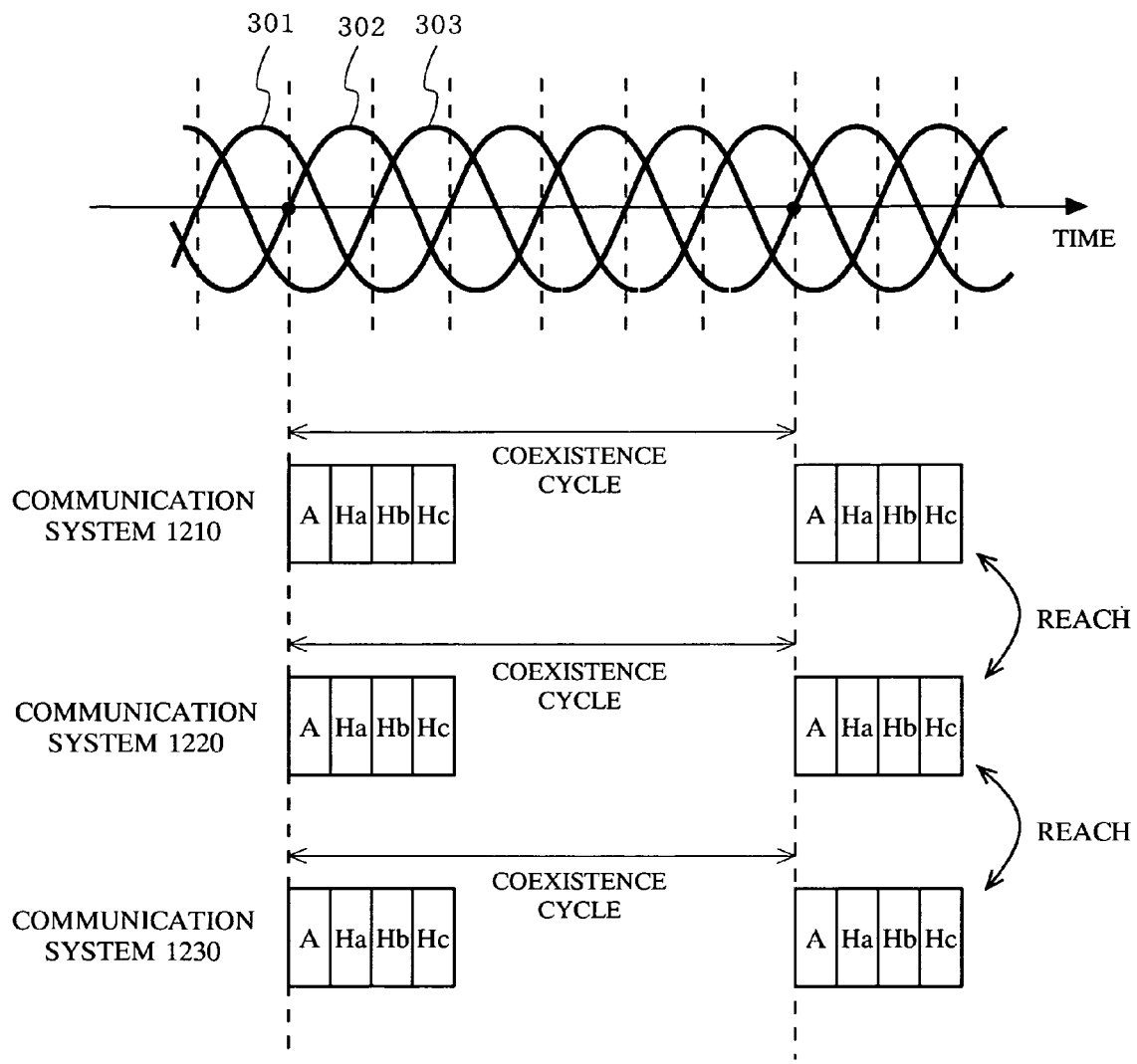
FIGS. 16 and 17 are diagrams illustrating an exemplary coexistence process performed by the communication system of the second embodiment of the present invention.

Initially, using a coexistence signal transmitted by the access communication system 120 as a reference, the in-home communication system 110 synchronizes with the coexistence signal, and transmits a coexistence signal including information about itself. Next, the in-home communication system 130 synchronizes with this coexistence signal, and transmits a coexistence signal further including information about itself. Finally, the in-home communication system 140 synchronizes with this coexistence signal, and transmits a coexistence signal further including information about itself. Thereby, the in-home communication systems 110, 130 and 140 construct a coexistence control relationship. This is illustrated in FIG. 16.

Figure 17:
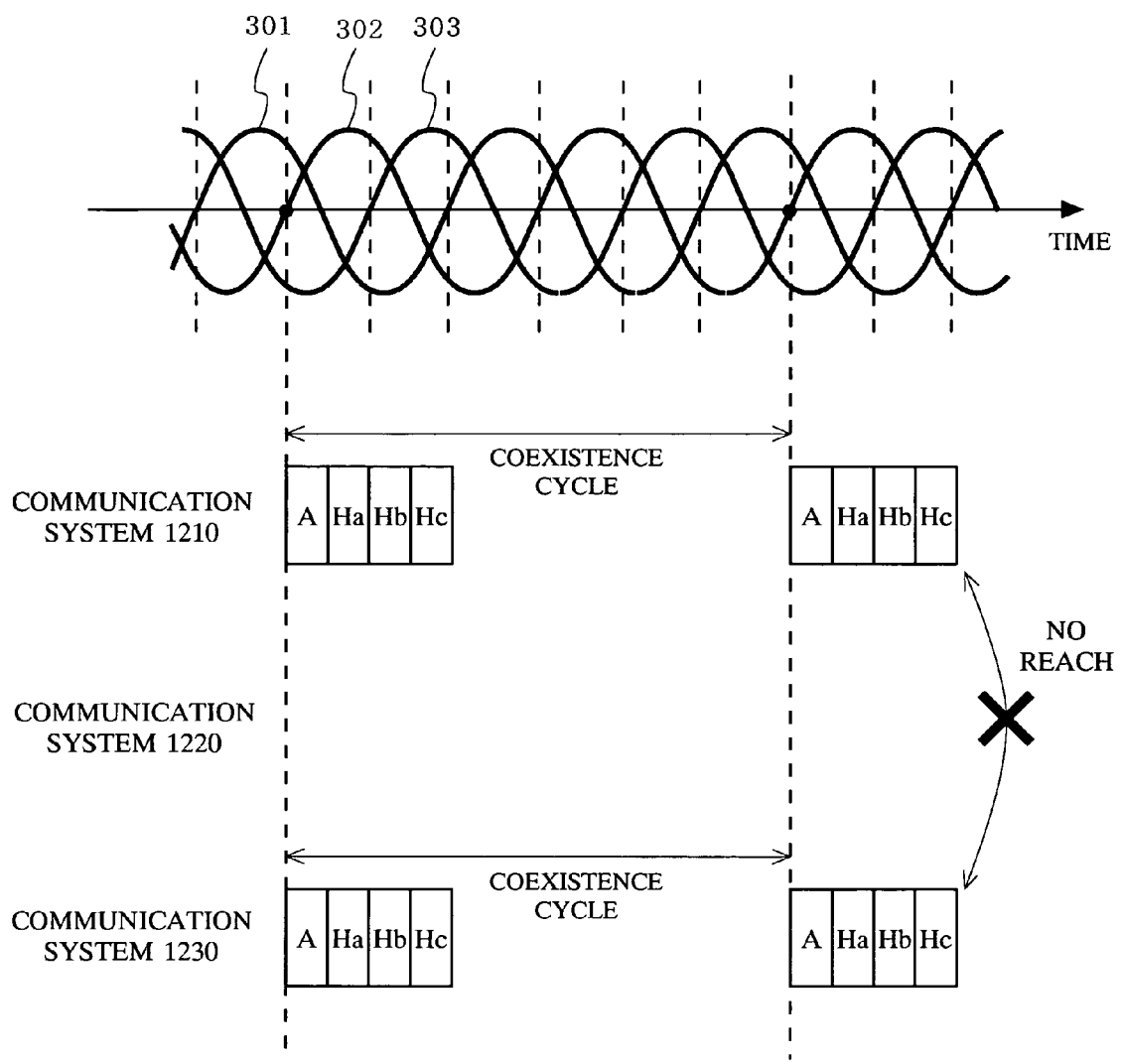
Figure 18:
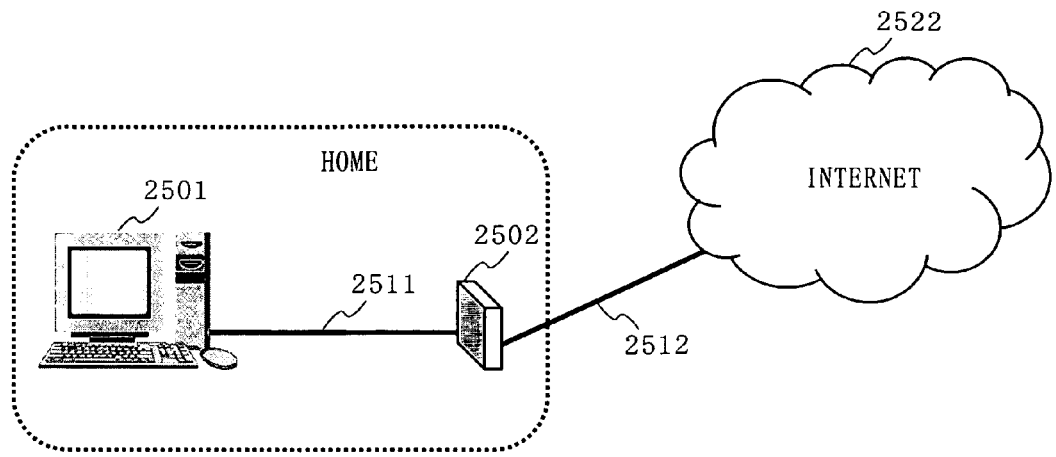
FIGS. 18 to 20 are diagrams illustrating a conventional configuration of a general communication system which accesses the Internet from a home.
Figure 19:
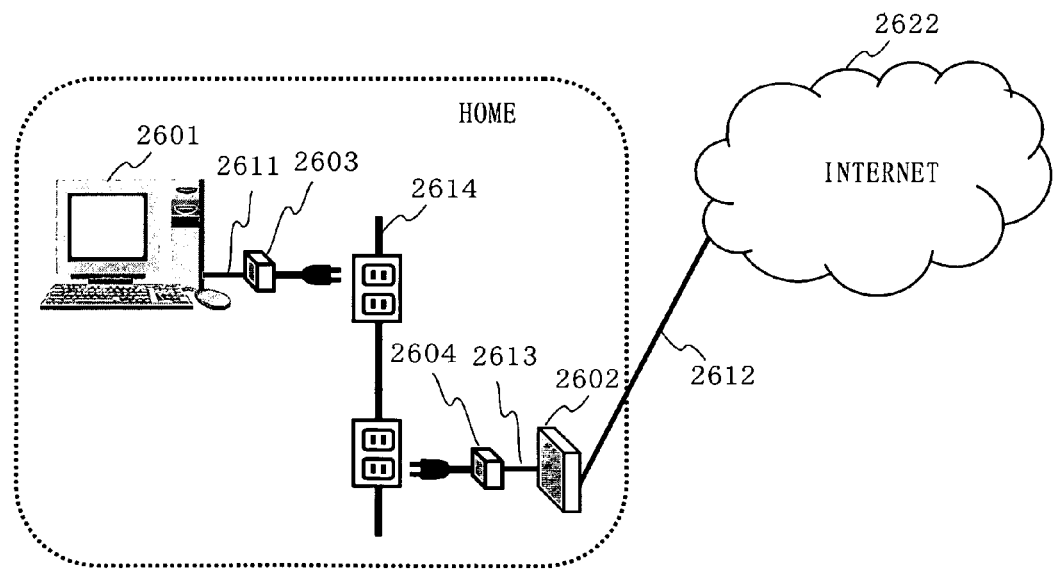
Figure 20:
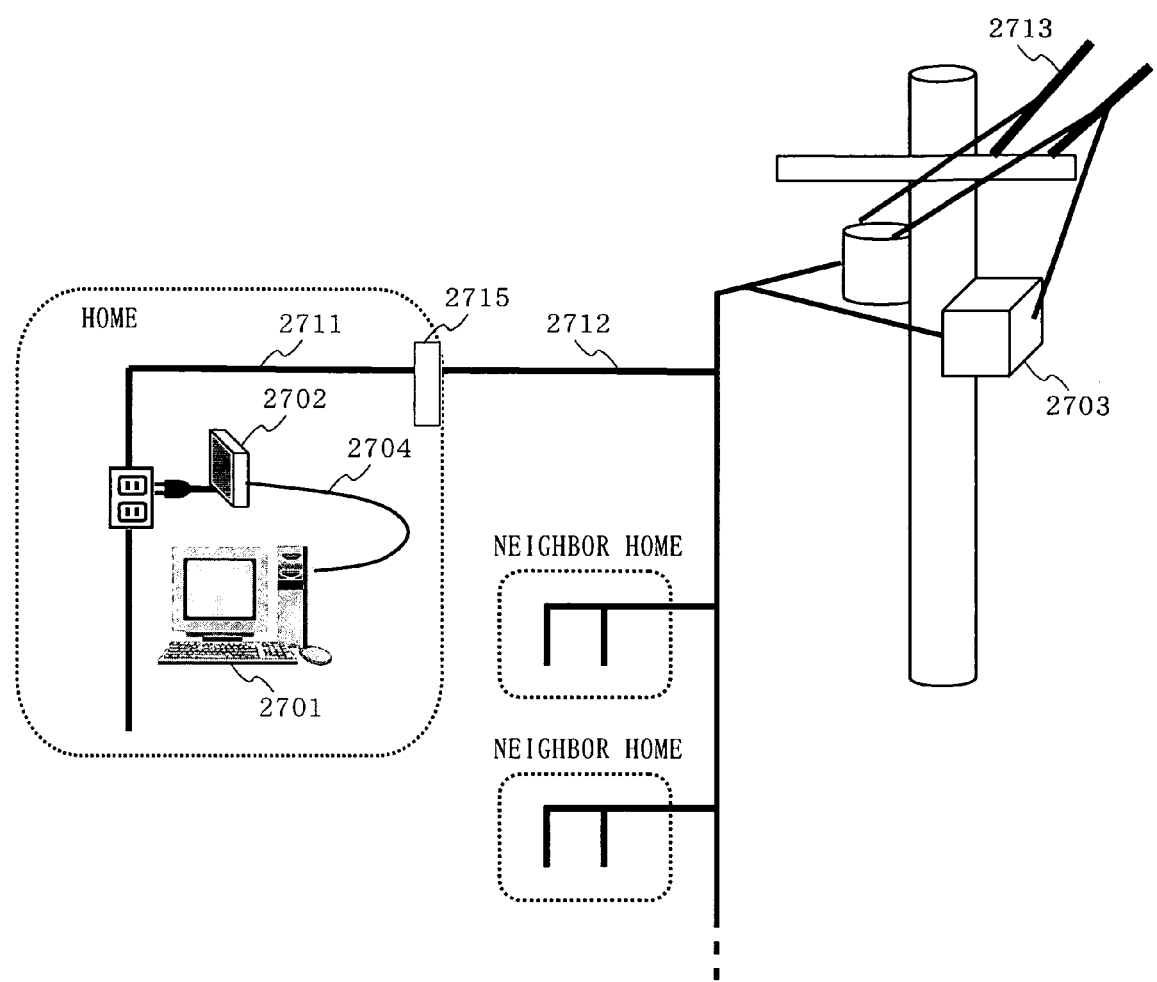
Figure 21:
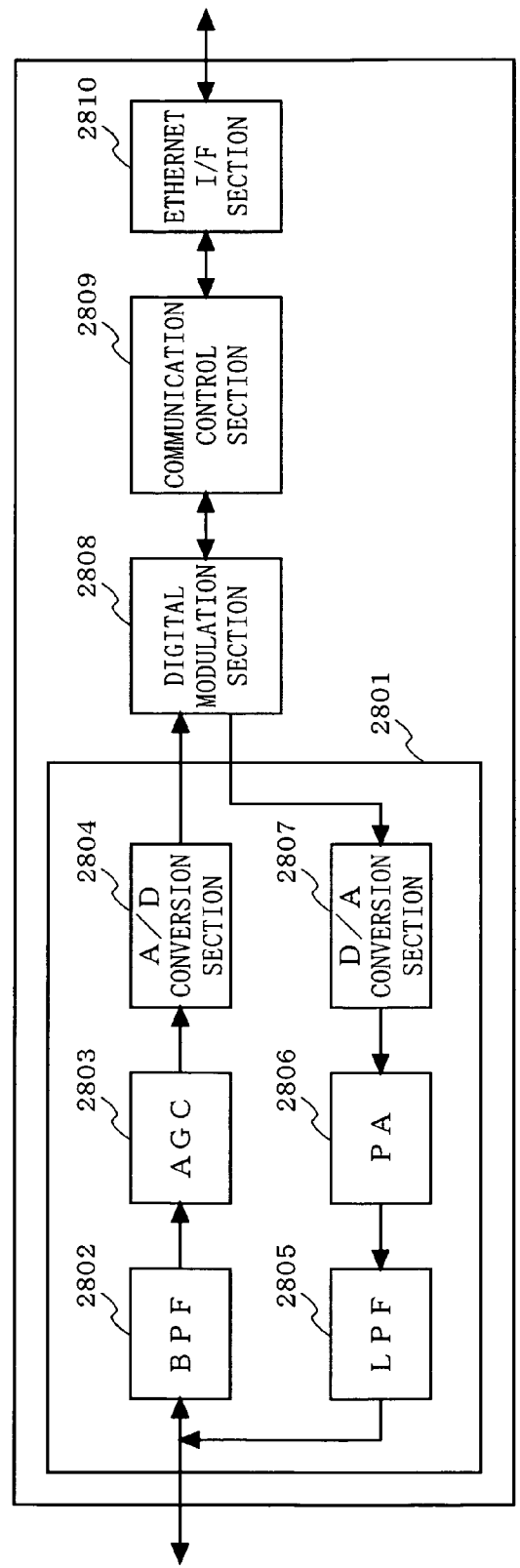
FIG. 21 is a diagram illustrating an internal configuration of a general power line communication modem which is implemented as a bridge with respect to Ethernet.
Figure 22:
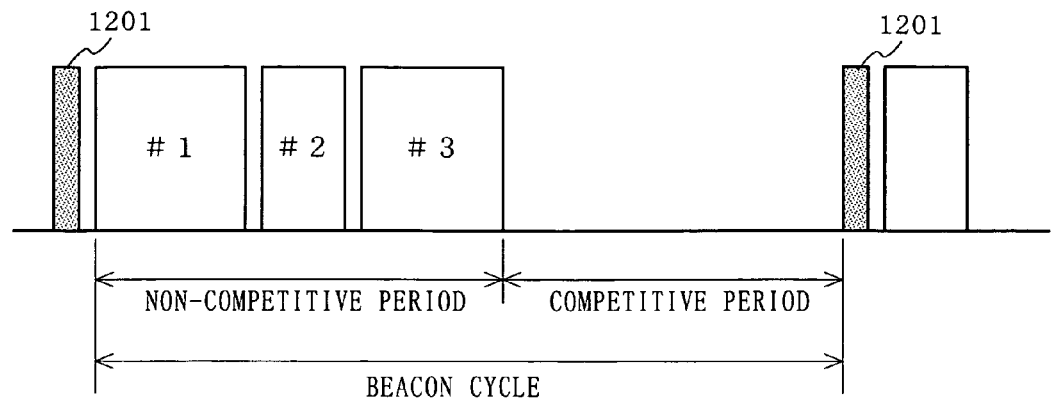
FIG. 22 is a diagram illustrating timing of a conventional power line communication method which performs communication while keeping AV-QoS.
Figure 23:
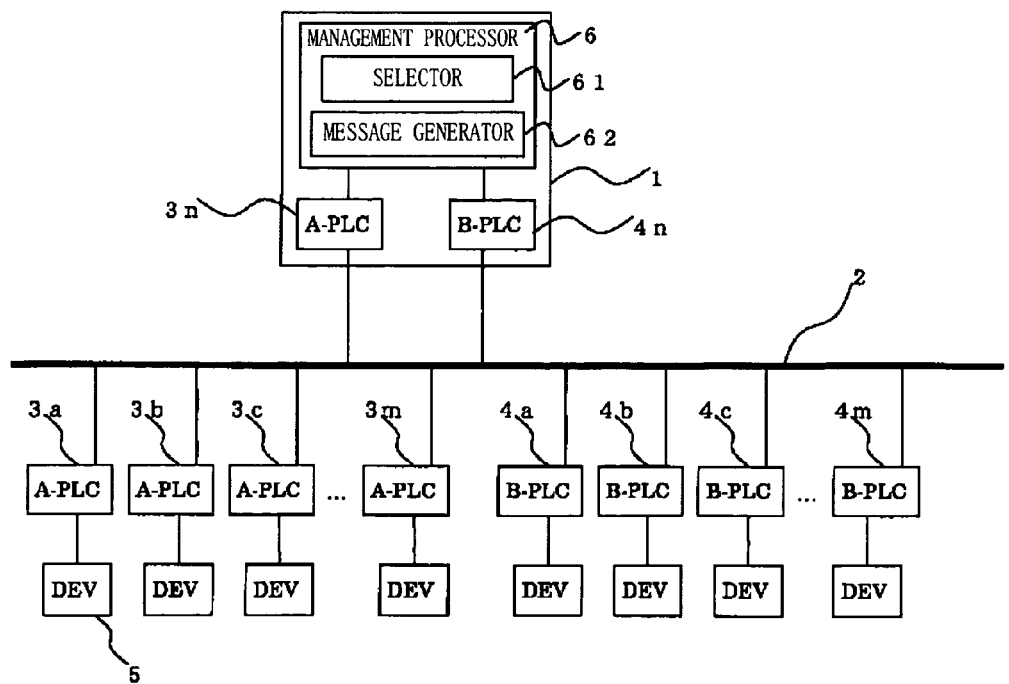
FIG. 23 is a diagram illustrating an exemplary configuration of a conventional communication system which causes a plurality of power line modems to coexist.

When the in-home communication system 130 is powered OFF in this situation, the in-home communication systems 110 and 140 cannot mutually receive a coexistence signal transmitted from the other of them (FIG. 17). Therefore, the in-home communication systems 110 and 140 transmit a coexistence signal with respective separate timings.

However, in the present invention, the in-home communication systems 110 and 140 continue to transmit a coexistence signal at predetermined intervals which synchronize with a common commercial power supply, so that the transmission timings are maintained. Therefore, even when the in-home communication system 130 is subsequently powered ON again, the synchronization of the coexistence signal of the in-home communication system 110 and the coexistence signal of the in-home communication system 140 is maintained, so that the in-home communication system 130 can transmit a coexistence signal with this synchronized timing.

As described above, according to the communication system and the coexistence method of the second embodiment of the present invention which employ a communication apparatus, the coexistence signal transmission timing is synchronized with a commercial power supply, so that a coexisting communication system can keep operating stably. Therefore, the conventional drawback that QoS quality is impaired every time a coexisting communication system is activated or stopped, can be significantly overcome.

Note that the above-described embodiments may be each implemented by causing a CPU to interpret and execute predetermined program data capable of executing the above-described procedure, the program being stored in a storage apparatus (a ROM, a RAM, a hard disk, etc.). In this case, the program data may be stored into the storage apparatus via a recording medium, or may be executed directly from the recording medium. The recording medium refers to a semiconductor memory, such as a ROM, a RAM, a flash memory or the like; a magnetic disk memory, such as a flexible disk, a hard disk or the like; an optical disc, such as a CD-ROM, a DVD, a BD or the like; a memory card; or the like. The recording medium is a concept including a communication medium, such as a telephone line, a transfer line, or the like.

Functional blocks of each embodiment, such as the beacon transmission timing determining section, the power reference point extracting section, the coexistence signal transmitting/receiving section, the TDM coexistence control section, and the modem signal transmitting/receiving section, and the like, may be typically implemented as an integrated circuit (LSI: LSI is called IC, system LSI, super LSI or ultra LSI, depending on the packaging density). Each functional block may be separately mounted on one chip, or a part or the whole of the functional blocks may be mounted on one chip. Also, a portion involved in communication and a portion involved in transmission/reception of a coexistence signal in one communication system may be mounted on separate LSI chips.

The integrated circuit is not limited to LSI. The integrated circuit may be achieved by a dedicated circuit or a general-purpose processor. Further, a Field Programmable Gate Array (FPGA) which can be programmed after LSI production or a reconfigurable processor in which connection or settings of circuit cells in LSI can be reconfigured, may be used.

Furthermore, if an integrated circuit technology which replaces LSI is developed by an advance in the semiconductor technology or the advent of other technologies derived therefrom, the functional blocks may be packaged using such a technology. A biotechnology may be applicable.

The in-home communication apparatus of the present invention may be in the form of an adaptor which converts a signal interface, such as Ethernet interface, IEEE1394 interface, USB interface, or the like, into interface for power line communication, and thereby, can be connected to multimedia apparatuses, such as a personal computer, a DVD recorder, a digital television, a home system server, and the like, which have various kinds of interface. Thereby, a network system which transmits digital data, such as multimedia data or the like, via a power line as a medium with high speed, can be constructed. As a result, a power line which is already provided in homes, offices and the like can be directly used as a network line without newly introducing a network cable, such as a conventional wired LAN. Therefore, the present invention is considerably useful in terms of cost and ease of installation.

The functions of the present invention may be incorporated into the above-described multimedia apparatuses in the future. Thereby, data transfer can be achieved between the multimedia apparatuses via a power source cable thereof. In this case, an adaptor, an Ethernet cable, an IEEE1394 cable, a USB cable, and the like are not required, thereby simplifying wiring. Also, the high-speed power line transmission system of the present invention can be connected via a router to the Internet, or via a hub to a wireless LAN or a conventional wired cable LAN, thereby extending a LAN system in which the high-speed power line transmission system of the present invention is used without any problem. Communication data transferred via a power line by power line transmission may be intercepted by an apparatus directly connected to the power line, but is free from an eavesdrop problem with wireless LAN. Therefore, the power line transmission scheme is effective for data protection in terms of security. Further, data transferred on a power line may be protected by IPSec of an IP protocol, encryption of the contents themselves, other DRM schemes, or the like.

As compared to conventional power line communication, high-quality AV content transmission on a power line can be achieved by using a copyright protection function employing the above-described encryption of contents or efficient communication media (an effect of the present invention), and further implementing a QoS function.

While the invention has been described in detail, the foregoing description is in all aspects illustrative and not restrictive. It is understood that numerous other modifications and variations can be devised without departing from the scope of the invention.

What is claimed is:

1. A communication apparatus for allocating a transmission band to secure a quality of service (QoS) based on a reference signal, the communication apparatus belonging to (i) one or more in-home communication systems that perform communication within a limited region or (ii) an access communication system that connects the limited region to a wide area network, at least one of the in-home communication systems and the access communication system coexisting on a same communication medium by time division, the communication apparatus comprising:
  a power reference point extracting section operable to extract a reference point of a commercial power supply that is supplied on a power line;
  a TDM coexistence control section operable to (i) receive and transmit a coexistence signal in synchronization with the extracted reference point to detect the coexistence signal and (ii) perform time division of a time division multiplexing (TDM) cycle with another communication system based on the detected coexistence signal; and
  a transmission timing determining section operable to synchronize, in accordance with a result of the time division of the TDM cycle, a timing of transmitting the reference signal with the reference point extracted by the power reference point extracting section.

2. The communication apparatus of claim 1, wherein the power reference point extracting section defines, as the reference point, a zero-crossing point of the commercial power supply.

3. The communication apparatus of claim 1, wherein the power reference point extracting section defines, as the reference point, a point that is phase-shifted by an integral multiple of 60 degrees from a zero-crossing point of the commercial power supply.

4. The communication apparatus of claim 1, wherein the reference signal is a beacon.

5. A method performed by a communication apparatus for allocating a transmission band to secure a quality of service (QoS) based on a reference signal, the communication apparatus belonging to (i) one or more in-home communication systems that perform communication within a limited region or (ii) an access communication system that connects the limited region to a wide area network, at least one of the in-home communication systems and the access communication system coexisting on a same communication medium by time division, the method comprising:
  extracting a reference point of a commercial power supply that is supplied on a power line;
  receiving and transmitting a coexistence signal in synchronization with the extracted reference point to detect the coexistence signal;
  performing time division of a time division multiplexing (TDM) cycle with another communication system based on the detected coexistence signal; and
  synchronizing, in accordance with a result of the time division of the TDM cycle, a timing of transmitting the reference signal with the reference point extracted by the extracting of the reference point.

6. An integrated circuit for use in a communication apparatus for allocating a transmission band to secure a quality of service QoS based on a reference signal, the communication apparatus belonging to (i) one or more in-home communication systems that perform communication within a limited region or (ii) an access communication system that connects the limited region to a wide area network at least one of the in-home communication systems and the access communication system coexisting on a same communication medium by time division, the integrated circuit comprising circuitry functioning as:
  a power reference point extracting section operable to extract a reference point of a commercial power supply that is supplied on a power line;
  a TDM coexistence control section operable to (i) receive and transmit a coexistence signal in synchronization with the extracted reference point to detect the coexistence signal and (ii) perform time division of a time division multiplexing (TDM) cycle with another communication system based on the detected coexistence signal; and
  a transmission timing determining section operable to synchronize, in accordance with a result of the time division of the TDM cycle, a timing of transmitting the reference signal with the reference point extracted by the power reference point extracting section.

* * * * *